(12) United States Patent
Vu et al.

(10) Patent No.: US 8,547,791 B2
(45) Date of Patent: Oct. 1, 2013

(54) DEVICE AND METHOD FOR GENERATING A BEAM OF ACOUSTIC ENERGY FROM A BOREHOLE, AND APPLICATIONS THEREOF

(75) Inventors: Cung Khac Vu, Houston, TX (US); Dipen N. Sinha, Los Alamos, NM (US); Cristian Pantea, Los Alamos, NM (US); Kurt T. Nihei, Oakland, CA (US); Denis P. Schmitt, Katy, TX (US); Christopher Skelt, Houston, TX (US)

(73) Assignees: Chevron U.S.A. Inc., San Ramon, CA (US); Los Alamos National Security LLC, Los Alamos, NM (US)

( * ) Notice: Subject to any disclaimer, the term of this patent is extended or adjusted under 35 U.S.C. 154(b) by 475 days.

(21) Appl. No.: 12/793,420

(22) Filed: Jun. 3, 2010

(65) Prior Publication Data

US 2011/0080805 A1    Apr. 7, 2011

Related U.S. Application Data

(63) Continuation-in-part of application No. 12/166,842, filed on Jul. 2, 2008, now Pat. No. 7,839,718.

(51) Int. Cl.
*G01V 1/00*    (2006.01)
(52) U.S. Cl.
USPC .......................................................... 367/32
(58) Field of Classification Search
USPC ............... 367/30, 32, 69, 137, 138; 181/104
See application file for complete search history.

(56) References Cited

U.S. PATENT DOCUMENTS

| | | |
|---|---|---|
| 3,302,745 A | 2/1967 | Ikrath |
| 3,732,945 A | 5/1973 | Lavigne |

(Continued)

FOREIGN PATENT DOCUMENTS

| | | |
|---|---|---|
| EP | 1122558 A1 | 8/2001 |
| GB | 2168568 A | 6/1986 |

(Continued)

OTHER PUBLICATIONS

International Preliminary Report on Patentability Report for PCT International Patent Application No. PCT/US2011/035358, mailed Jul. 26, 2012.

(Continued)

*Primary Examiner* — Krystine Breier
(74) *Attorney, Agent, or Firm* — Pillsbury Winthrop Shaw Pittman LLP

(57) ABSTRACT

In some aspects of the invention, a method of generating a beam of acoustic energy in a borehole is disclosed. The method includes generating a first broad-band acoustic pulse at a first broad-band frequency range having a first central frequency and a first bandwidth spread; generating a second broad-band acoustic pulse at a second broad-band frequency range different than the first frequency range having a second central frequency and a second bandwidth spread, wherein the first acoustic pulse and second acoustic pulse are generated by at least one transducer arranged on a tool located within the borehole; and transmitting the first and the second broad-band acoustic pulses into an acoustically non-linear medium, wherein the composition of the non-linear medium produces a collimated pulse by a non-linear mixing of the first and second acoustic pulses, wherein the collimated pulse has a frequency equal to the difference in frequencies between the first central frequency and the second central frequency and a bandwidth spread equal to the sum of the first bandwidth spread and the second bandwidth spread.

18 Claims, 34 Drawing Sheets

(56) References Cited

U.S. PATENT DOCUMENTS

| | | | |
|---|---|---|---|
| 3,872,421 A | | 3/1975 | Rogers et al. |
| 3,974,476 A | * | 8/1976 | Cowles .......................... 367/87 |
| 4,253,166 A | | 2/1981 | Johnson |
| 4,382,290 A | * | 5/1983 | Havira ........................... 367/35 |
| 4,509,149 A | | 4/1985 | Ruehle |
| 4,646,565 A | | 3/1987 | Siegfried |
| 4,757,873 A | | 7/1988 | Linyaev et al. |
| 4,805,873 A | | 2/1989 | Mouton |
| 5,144,590 A | | 9/1992 | Chon |
| 5,521,882 A | | 5/1996 | D'Angelo et al. |
| 5,719,823 A | | 2/1998 | Earp |
| 5,787,049 A | | 7/1998 | Bates |
| 6,009,043 A | | 12/1999 | Chon et al. |
| 6,175,536 B1 | | 1/2001 | Khan |
| 6,216,540 B1 | | 4/2001 | Nelson et al. |
| 6,440,075 B1 | | 8/2002 | Averkiou |
| 6,590,832 B2 | * | 7/2003 | Dubois et al. .................. 367/92 |
| 6,597,632 B2 | | 7/2003 | Khan |
| 6,631,783 B2 | | 10/2003 | Khan |
| 6,704,247 B1 | | 3/2004 | Ruffa |
| 6,937,938 B2 | | 8/2005 | Sansone |
| 7,059,404 B2 | | 6/2006 | Flecker et al. |
| 7,301,852 B2 | | 11/2007 | Leggett, III et al. |
| 7,310,580 B2 | | 12/2007 | Zhou et al. |
| 7,463,551 B2 | | 12/2008 | Leggett, III et al. |
| 8,116,167 B2 | | 2/2012 | Johnson et al. |
| 2005/0036403 A1 | | 2/2005 | Leggett, III et al. |
| 2010/0002540 A1 | | 1/2010 | Vu et al. |
| 2011/0080803 A1 | | 4/2011 | Vu et al. |

FOREIGN PATENT DOCUMENTS

| | | |
|---|---|---|
| GB | 2404983 A | 2/2005 |
| SU | 913303 A | 3/1982 |
| WO | WO 02/04985 A2 | 1/2002 |
| WO | WO 2007/030016 | 3/2007 |
| WO | WO 2008/094050 A2 | 8/2008 |

OTHER PUBLICATIONS

International Search Report and Written Opinion for PCT International Patent Application No. PCT/US2010/031485, mailed Aug. 2, 2010.
International Search Report and Written Opinion for PCT International Patent Application No. PCT/US2010/031490, mailed Sep. 14, 2010.
AAS et al.; 3-D Acoustic Scanner, SPE, Society of Petroleum Engineers, Sep. 23-26, 1990, pp. 725-732.
International Preliminary Report on Patentability for PCT International Patent Application No. PCT/US2009/047184, mailed Dec. 23, 2010.
International Preliminary Report on Patentability for PCT International Patent Application No. PCT/US2010/031490, mailed Oct. 27, 2011.
International Preliminiary Report on Patentability for PCT International Patent Application No. PCT/US2010/031485, mailed Oct. 27, 2011.
International Preliminiary Report on Patentability for PCT International Patent Application No. PCT/US2010/047934, mailed Dec. 1, 2009.
Tserkovnyak et al., "Nonlinear tube waves in permeable formations: Difference frequency generation", Journal of the Acoustical Society of America, Jul. 1, 2004, vol. 116, Issue 1, pp. 209-216.
Singapore Office Action for Singapore Patent Application No. 201009640-2, mailed Dec. 2, 2011.
PCT International Search Report an Written Opinion for PCT International Patent Application No. PCT/US2011/035608, mailed Dec. 22, 2011.
PCT International Search Report an Written Opinion for PCT International Patent Application No. PCT/US2011/035595, mailed Dec. 27, 2011.
PCT International Search Report an Written Opinion for PCT International Patent Application No. PCT/US2011/035358, mailed Dec. 29, 2011.
International Preliminary Report on Patentability for PCT International Patent Application No. PCT/US2009/047934, mailed on Jan. 13, 2011.
International Preliminary Report on Patentability for PCT International Patent Application No. PCT/US2009/047184, mailed on Dec. 14, 2010.
International Search Report and Written Opinion for PCT International Patent Application No. PCT/US2009/047934 mailed Dec. 1, 2009.
International Search Report and Written Opinion for PCT International Patent Application No. PCT/US2009/047184, mailed Dec. 21, 2009.
Westervelt, "Parametric Acoustic Array", The Journal of the Acoustical Society of America, vol. 35, No. 4, Apr. 1963, pp. 535-537.
Johnson et al., "Nonlinear Generation of Elastic Waves in Crystalline Rock", Journal of Geophysical Research, vol. 92, No. B5, Apr. 10, 1987, pp. 3597-3602.
Ostrovsky et al., "Dynamic Nonlinear Elasticity in Geomaterials", Rivista del Nuovo Cimento, vol. 24, No. 7., 2001.
Johnson et al., "Nonlinear Generation of Elastic Waves in Granite and Sandstone: Continuous Wave and Travel Time Observations", Journal of Geophysical Research, vol. 94, No. B12, Dec. 10, 1989, pp. 17,729-17,733.
Jones et al., "Interaction of Elastic Waves in an Isotropic Solid", The Journal of the Acoustical Society of America, vol. 35, No. 1, Jan. 1963, pp. 5-10.
Rollins et al., "Ultrasonic Study of Three-Phonon Interactions. II. Experimental Results", Physical Review, vol. 136, No. 3A, Nov. 1964, pp. 597-601.
Korneev et al., "Nonlinear Interaction of Plane Elastic Waves", Lawrence Berkeley National Laboratory Report LBNL-41914, 1998.
U.S. Office Action regarding U.S. Appl. No. 12/793,407, dated Oct. 25, 2012, (25 pages).
Hungarian Second Written Opinion regarding Singapore Application No. 201009640-2, dated Aug. 21, 2012, (9 pages).
U.S. Office Action regarding U.S. Appl. No. 12/793,414, dated Oct. 29, 2012, 2012, 13 pages.
Chinese Office Action for Chinese Application No. 200980131920.4, dated Oct. 22, 2012, 35 pages.
Canadian Office Action for Canadian Application No. 2,729,059, dated Nov. 21, 2012, 3 pages.
International Preliminary Report on Patentability for PCT/US2011/035608, mailed Dec. 13, 2012.

* cited by examiner

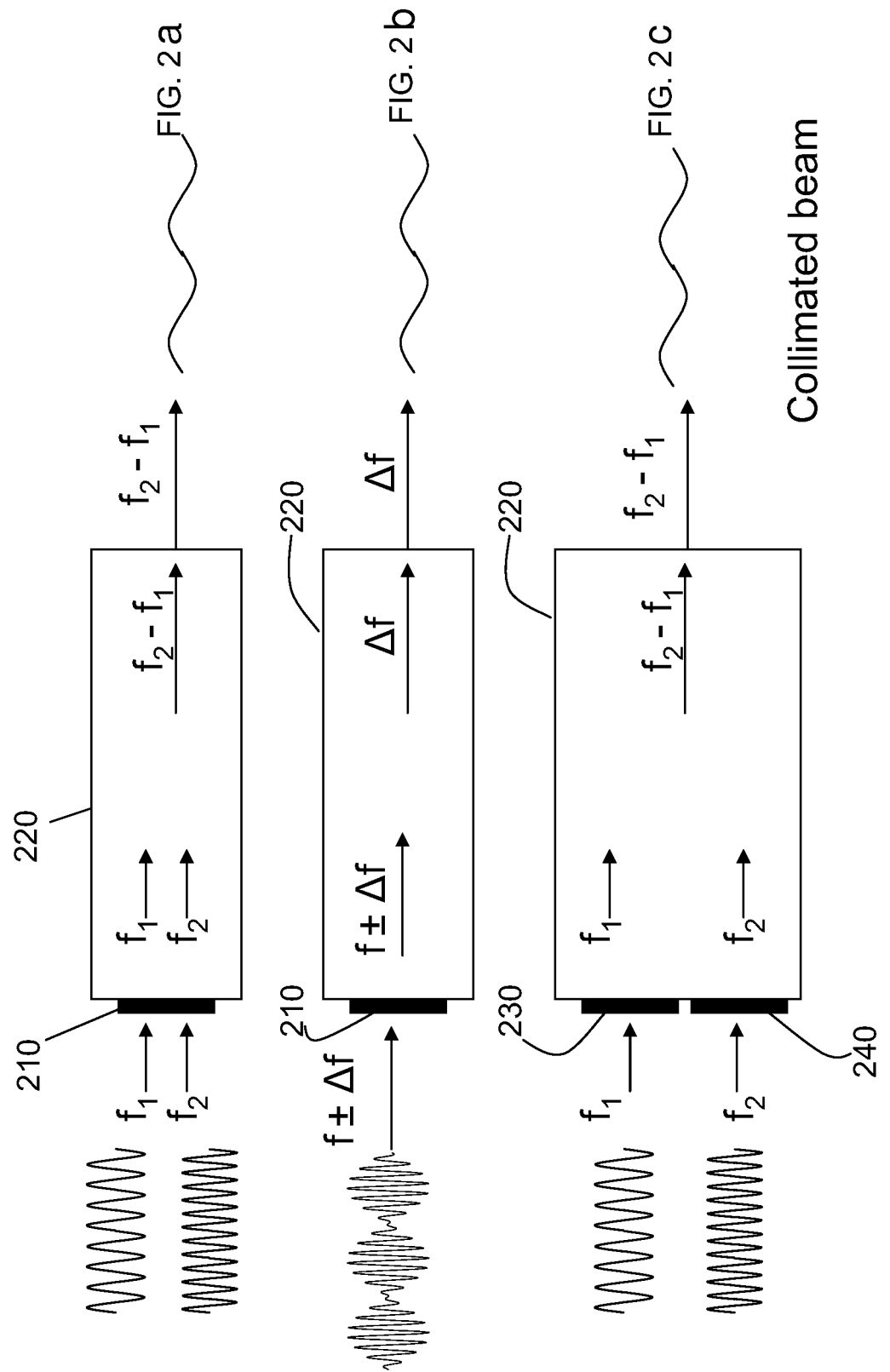

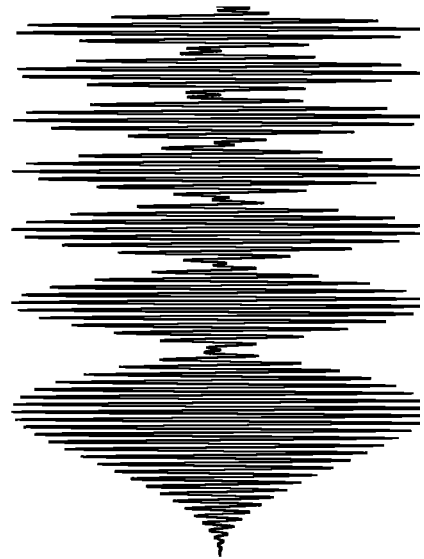
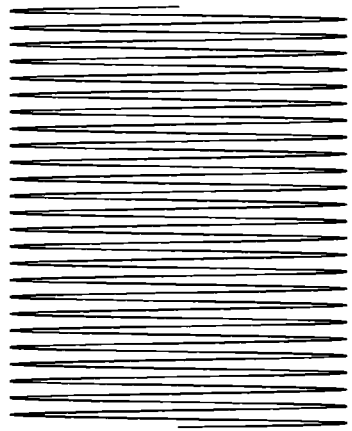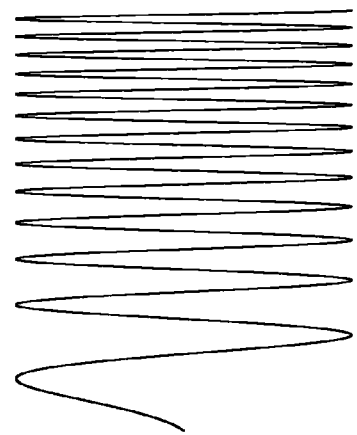

Difference signal

FFT of difference signal

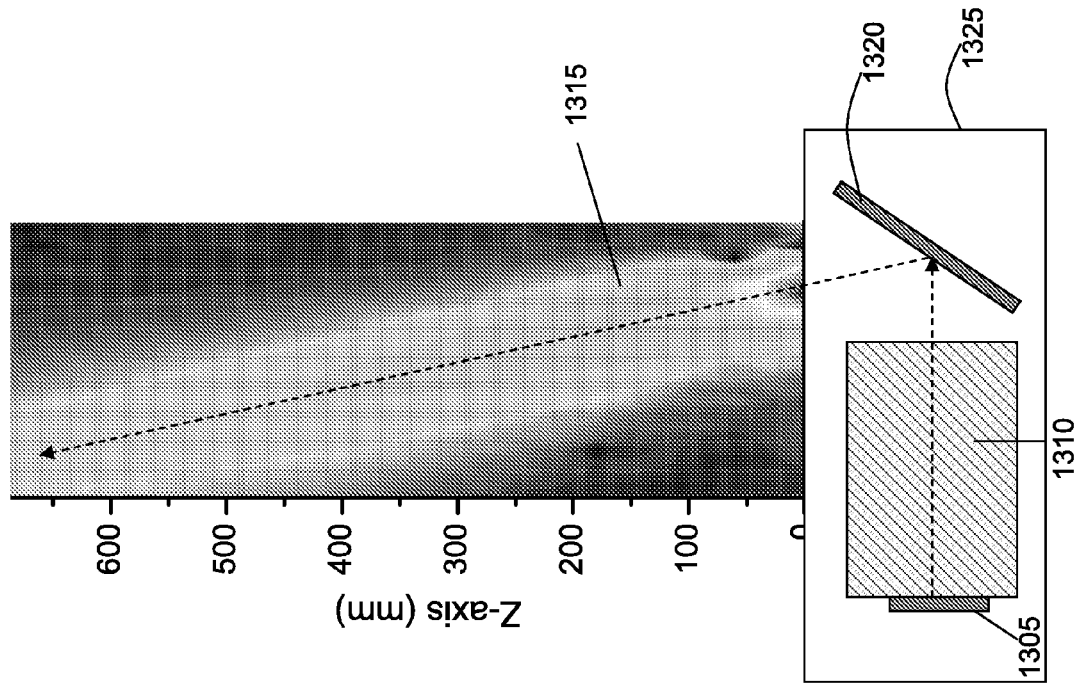
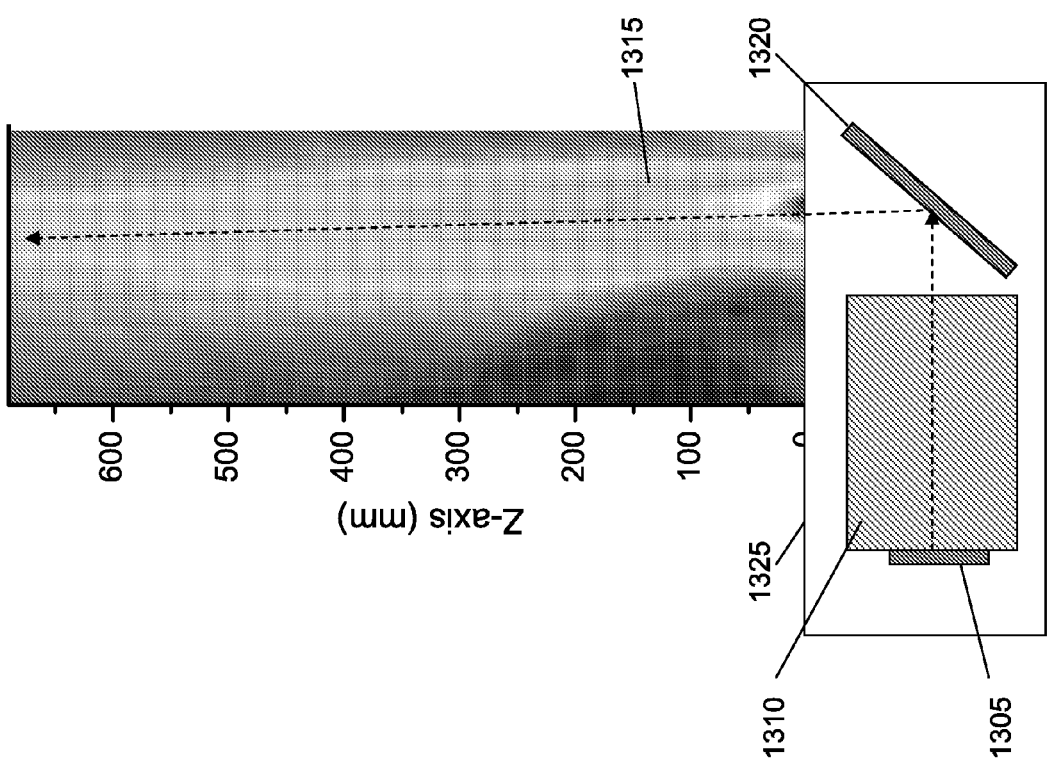
Fig. 13A
Fig. 13B

Imaging of Object Outside Pipe

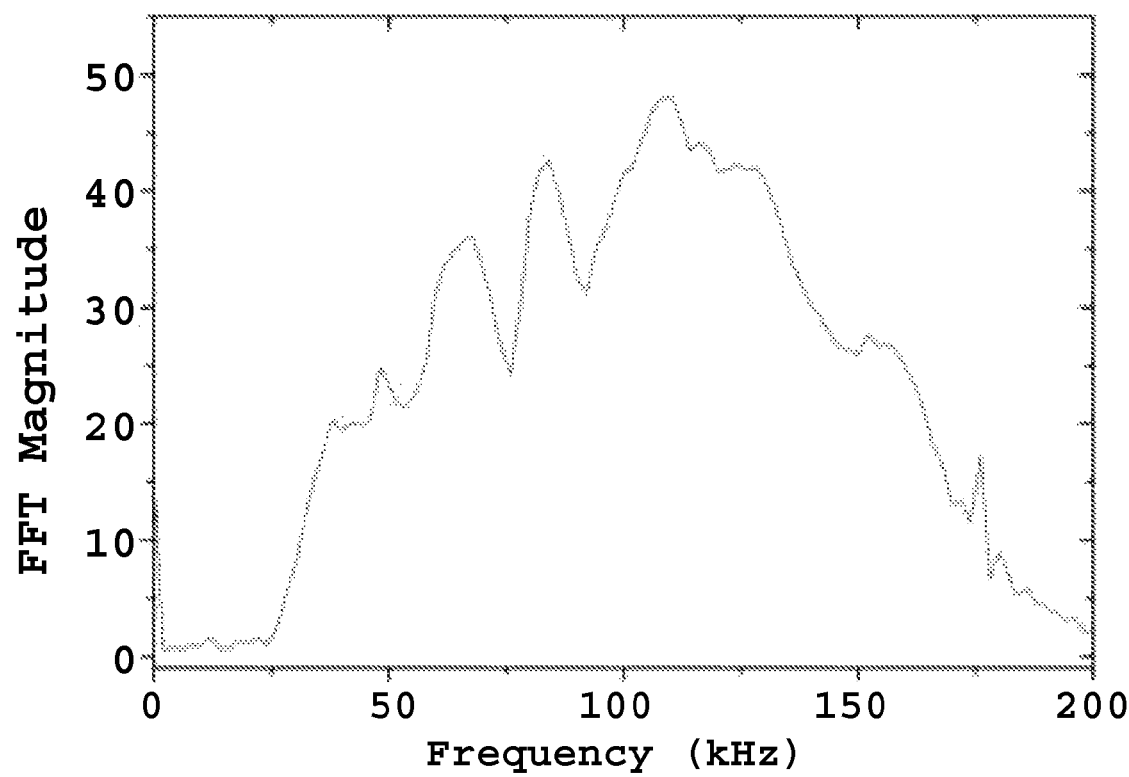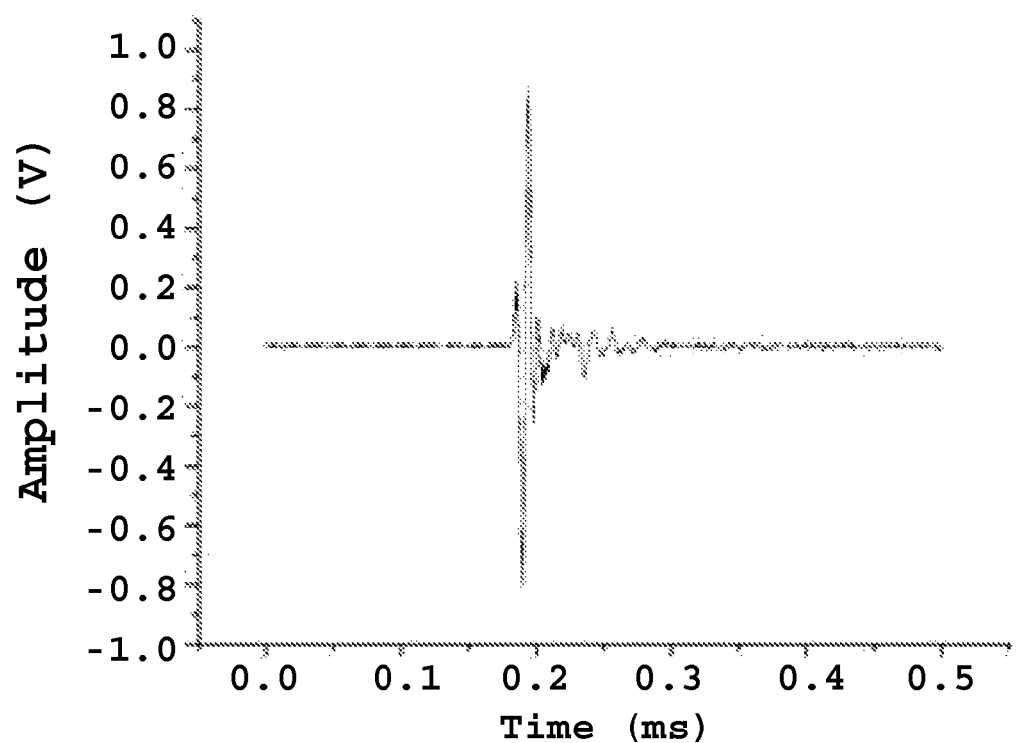
Figure 18

DEVICE AND METHOD FOR GENERATING A BEAM OF ACOUSTIC ENERGY FROM A BOREHOLE, AND APPLICATIONS THEREOF

CROSS-REFERENCE TO RELATED APPLICATIONS

This application is a continuation-in-part of pending U.S. patent application Ser. No. 12/166,842 filed on Jul. 2, 2008, the contents of which are incorporated by reference in its entirety.

GOVERNMENT RIGHTS

This invention was made with Government support under Cooperative Research and Development Agreement (CRADA) Contract Number DE-AC52-06NA25396 awarded by the United States Department of Energy. The Government may have certain rights in this invention.

FIELD

The present invention relates generally to acoustic interrogation of rock formations around a borehole and more particularly to using the combination of an acoustic source including a single transducer or an array of transducers in the wellbore coupled to a non-linear material for producing an acoustic beam as a probing tool from a borehole to interrogate the properties of rock formations and materials surrounding the borehole.

BACKGROUND

Acoustic interrogation of subsurface features tends to be limited by the size and power of practical sources, and in practice, the output of downhole acoustic transducers is limited by the power transmission capabilities of the wire line cable. High frequency signals have a relatively short penetration distance, while low frequency signals generally require large sources, clamped to the borehole wall, to maximize energy transfer to the formation and minimize unwanted signals within the well bore. It is difficult to generate a collimated acoustic beam signal in the 10 kHz-100 kHz range from the borehole to probe the rock formation surrounding a borehole, or any other material in the environment, such as casing or cement, with conventional low-frequency transducers. Conventional low-frequency acoustic sources in this frequency range have low bandwidth, less than 30% of the center frequency, and very large beam spread that depends on the frequency, such that as the frequency decreases, the beam spread increases. The generation of a collimated beam requires a number of conditions to be satisfied, including a long source array, uniform coupling of all the transducers to the rock formation around the borehole and knowledge of the acoustic velocities of the rock formation. In the borehole environment, these conditions are not often achievable because of underlying physics constraints, engineering feasibility or operating conditions.

Acoustic beam sources based on a non-linear mixing of acoustic waves have been proposed for general applications in fluid media, such as underwater sonar, since the 1950s. For subsurface applications, U.S. Pat. No. 3,974,476 to Cowles discloses an acoustic source for borehole surveys. The disclosure of Cowles describes an acoustic source generation device, for example, a device that is capable of the generation of a 1 kHz frequency beam by mixing two frequencies around 5 MHz in a borehole environment violates basic physical principles. A typical wireline logging tool has a diameter of 3⅝ inch (9.2 cm), while the wavelength of a 1 kHz wave in a typical fluid of 1500 m/s is 1.5 m. This represents close to 10 times the borehole diameter. This 1 kHz acoustic wave cannot stay collimated without violating the basic uncertainty principle of wave diffraction physics. Moreover, the mixing of 5 MHz frequencies to generate a 1 kHz wave represents a step-down frequency ratio of 5000:1, which has not been demonstrated to be achievable in practice.

SUMMARY

In accordance with some aspects of the present disclosure, a method of generating a beam of acoustic energy in a borehole is disclosed. The method includes generating a first broad-band acoustic pulse at a first broad-band frequency range having a first central frequency and a first bandwidth spread; generating a second broad-band acoustic pulse at a second broad-band frequency range different than the first frequency range having a second central frequency and a second bandwidth spread, wherein the first acoustic pulse and second acoustic pulse are generated by at least one transducer arranged on a tool located within the borehole; and transmitting the first and the second broad-band acoustic pulses into an acoustically non-linear medium, wherein the composition of the non-linear medium produces a collimated pulse by a non-linear mixing of the first and second acoustic pulses, wherein the collimated pulse has a frequency equal to the difference in frequencies between the first central frequency and the second central frequency and a bandwidth spread equal to the sum of the first bandwidth spread and the second bandwidth spread.

In accordance with the method, the frequency range of the collimated acoustic pulse can have a central frequency that is between 15 kHz and 120 kHz. Moreover, the non-linear medium can include a mixture of liquids, a solid, a granular material, embedded microspheres, or an emulsion, or a combination thereof. Further, the bandwidth spread of the collimated pulse can be between 50% and 200% of the first central frequency or the second central frequency. The method can further include transmitting the collimated pulse into a material around the borehole, wherein the material can be rock formation, cement, or casing, or combinations thereof. Further, the non-linear medium can have a velocity of sound between 100 m/s and 800 m/s. The method can further include reflecting and guiding the collimated pulse by an acoustic mirror.

In accordance with some aspects of the present disclosure, a wireline or pipe conveyed logging tool positionable within a borehole is disclosed. The tool can include a housing; at least one transducer, carried by the housing, and configured to produce a first acoustic pulse at a first frequency range having a first central frequency and a first bandwidth spread and a second acoustic pulse at a second frequency range different than the first frequency range having a second central frequency and a second bandwidth spread; and a non-linear medium carried by the housing, wherein the composition of the non-linear medium is configured to produce a collimated pulse by a non-linear mixing of the first and second acoustic pulses, wherein the collimated pulse has a frequency equal to the difference in frequencies between the first central frequency and the second central frequency and a bandwidth spread equal to the sum of the first bandwidth spread and the second bandwidth spread.

In accordance with the tool, the frequency range of the collimated acoustic pulse can have a central frequency that is between 15 kHz and 120 kHz. Moreover, the non-linear medium can include a mixture of liquids, a solid, a granular material, embedded microspheres, or an emulsion, or a combination thereof. Further, the bandwidth spread of the collimated pulse can be between 50% and 200% of the first central frequency or the second central frequency. The tool can further be arranged to transmit the collimated pulse into a material around the borehole, wherein the material can be rock formation, cement, or casing, or combinations thereof. Further, the non-linear medium can have a velocity of sound between 100 m/s and 800 m/s. The tool can further be arranged to reflect and guide the collimated acoustic pulse by an acoustic mirror.

In accordance with an aspect of the invention, a very compact device, positioned within a well bore, configured to generate and direct a collimated acoustic beam into materials and rock formation around a borehole, is disclosed. The device includes a transducer arranged within a logging tool in the borehole and configured to receive a first electronic signal at a first frequency and a second electronic signal at a second frequency generated by one or more electronic sources and to produce primary acoustic waves at the first frequency and the second frequency; and a low acoustic velocity non-linear material arranged in a transmission path of these primary acoustic waves in the logging tool and configured to generate a secondary collimated acoustic beam with a frequency equal to a difference in frequencies between the first frequency and the second frequency by a non-linear parametric array mixing process. The non-linear material can include a mixture of liquids, a solid, a granular material, embedded microspheres, and/or an emulsion with suitable properties: low acoustic velocity, low acoustic attenuation and high resistance to shock formation.

The device can further include an acoustic mirror configured to reflect the collimated acoustic beam and to steer the acoustic beam in a given direction into the materials and formation surrounding the borehole.

The device can further include a first acoustic lens or lens assembly arranged along a propagation path of the acoustic beam, configured to alter a beam geometry of the acoustic beam to control the beam collimation and/or a second acoustic lens or lens assembly arranged to compensate for an alteration of the beam radiation pattern due to a geometry of the interface and acoustic property differences between the borehole and the material surrounding the borehole. Further, the first acoustic lens assembly can be a converging lens to improve the beam collimation and the second acoustic lens assembly can be a diverging lens, wherein the diverging lens can be arranged to compensate for the effect on the propagating beam of a cylindrical borehole-formation interface.

The device can further include a receiver or a receiver array arranged in the borehole and configured to receive the acoustic beam after the acoustic beam has altered as a result of a characteristic of the formation, wherein the acoustic beam has been altered by being reflected, refracted and/or backscattered by materials and formation surrounding the borehole.

The device can further include a housing configured to house the transducer and the non-linear material. The housing can further include any combinations of the acoustic mirror and one or more lens assemblies. The transducer and non-linear material can be mounted axially within the logging tool.

The device can further include a signal encoder configured to encode the acoustic beam with a time-varying code by introducing a time-varying component including one or more of frequency chirping or frequency sweep to one of the first and the second signals.

The device can further include an electronic pulse generator configured to feed the transducer two electrical pulses of first and second frequencies to generate two acoustic beam pulses in a non-linear mixing medium in order to produce a secondary short duration acoustic pulse that propagates from the device as a collimated beam.

In accordance with an aspect of the invention, a method of generating a collimated acoustic beam with low frequency and broad bandwidth in a very small spatial volume, which is located within a logging tool in a borehole, and directing the beam into materials and rock formation surrounding the borehole is disclosed. The method includes producing a first acoustic wave at a first frequency bandwidth and a second acoustic wave at a second frequency bandwidth by a transducer located within the logging tool and transmitting the first and the second primary acoustic waves into a non-linear medium with low acoustic velocity that is arranged within the logging tool along a propagation path of the primary acoustic waves and configured to produce an secondary collimated acoustic beam by a non-linear mixing process, wherein the secondary collimated acoustic beam propagates through the non-linear medium in a same direction as an initial direction of the first and second acoustic waves and has a frequency bandwidth equal to a difference in frequencies between the frequencies of the first and the second primary acoustic waves.

The method can further include altering the beam geometry to improve collimation of the acoustic beam within the logging tool by a first acoustic lens arranged along a transmission path of the acoustic beam and/or compensating for an alternation of the beam geometry attributable to a characteristic of the borehole and maintaining an approximately collimated beam within the earth by a second acoustic lens. Moreover, the method can further include reflecting and guiding the acoustic beam in a given direction by an acoustic mirror. Further, the method can further include receiving the acoustic beam in the borehole by a receiver after the acoustic beam has altered as a result of a characteristic of the formation.

The method can further include exciting the transducer by a fixed, high frequency signal and a chirped frequency signal; producing one or more high frequency acoustic beams; receiving the one or more high frequency acoustic beams; generating a fixed frequency tone burst and a chirp having a same duration as the fixed frequency tone burst, wherein the fixed frequency tone burst is equal to the difference in frequency between the high frequency signal and the chirped frequency signal by the non-linear mixing process in the non-linear material. The fixed, high frequency signal can be between 250 kHz and 1.5 MHz and the chirped frequency signal can be chirped such that the difference between the fixed and chirped frequency is between 3% to 20%.

The method can further include producing a first pulse having a first central frequency and a first bandwidth spread and a second pulse having a second central frequency and a second bandwidth spread by the transducer; transmitting the first pulse and the second pulse in the non-linear material; and generating an acoustic beam pulse with a central frequency equal to the difference in frequency between the first central frequency and the second central frequency and a bandwidth spread equal to the sum of the first bandwidth spread and the second bandwidth spread by the non-linear material by the non-linear mixing process.

In accordance with an aspect of the invention, a system for imaging properties of the formation and other materials surrounding a borehole is disclosed. The system includes a compact low frequency acoustic source assembly and beam conditioning device within a logging tool conveyed in a borehole that directs a collimated acoustic beam out of the logging tool into the surrounding well bore and thence to the formation or casing and cement, such that some of the radiated energy returns to the well bore by a combination of reflection, refraction and scattering, an array of receivers, and the software and hardware necessary to control the beam direction and optimize its properties, record the received signals, and transform the recorded data to create images of the formation and other materials surrounding a borehole that may be interpreted to yield information about the volume surrounding the borehole.

The system further includes the generation of transmitted signals optimized in duration and frequency content for the imaging requirements of the application in question and the selection the dimensions and configuration of the beam generation and conditioning assembly and the receiver array to optimize system performance according to required application, and in particular the radial depth of investigation.

In accordance with an aspect of the invention, the system in paragraph 21 and 22 records data to be processed with imaging algorithms to generate 2D images of properties of the formation and other materials surrounding along the borehole axis for every azimuth direction similar to 2D reflection surface seismology. The system can further provide a scan of the 2D images for 360 degree azimuth direction. The set of scanned azimuth 2D images can subsequently stacked and/or processed with advanced imaging algorithms to provide a full 3D image of properties of the formation and other materials surrounding along the borehole axis.

The system may further include optimizing the processing algorithms and display of the resulting images such that the information that they contain about the properties around the well bore is readily evident to the user of the data.

In accordance with some aspects of the disclosure, wireline or pipe conveyed logging tool positionable within a well bore is disclosed. The tool includes (a) an ultrasonic transducer constructed and arranged to be placed in a borehole, the transducer configured to be excited by two simultaneous but not identical transient electrical signals of duration between 20-200 microseconds, with a first signal at a first frequency between 250 kHz and 1.5 MHz and a second signal at a second frequency between 300 kHz and 1.5 MHz, that produce first and second acoustic waves at the first frequency and the second frequency, respectively; (b) an acoustically non-linear material having a length between 3 and 12 inches arranged along a transmission path of the transducer that allows nonlinear mixing of the two acoustic waves generated by the transducer to produce a transient acoustic beam of the same duration as the original excitation signals with a frequency corresponding to the difference in instantaneous frequencies between the first frequency and the second frequency, the acoustic beam having a frequency between 15 and 120 kHz.

The tool can be configured such that the electrical signals are encoded by introducing a time-varying component including one or more of frequency chirping or frequency sweeps to one or both of the signals. Moreover, the tool can be configured such that the acoustic beam has the frequency between 15 and 120 kHz. Further, the tool can be configured such that the tool is arranged to maintain a level of collimation of the acoustic beam that depends on a mixing length in the nonlinear material and produce the acoustic beam such that the acoustic beam exits the nonlinear material, and continues to propagate through a medium in which the tool is immersed.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 2a, 2b and 2c show different modes of generating a difference frequency through a non-linear process in accordance with aspects of the disclosure.

FIGS. 5a and 5b show an aspect of the disclosure where the collimated beam is produced by a chirp burst.

FIGS. 13a and 13b show an aspect of the disclosure where the collimated beam after steering with an acoustical mirror exits the metal pipe casing.

DETAILED DESCRIPTION

Figure 1:
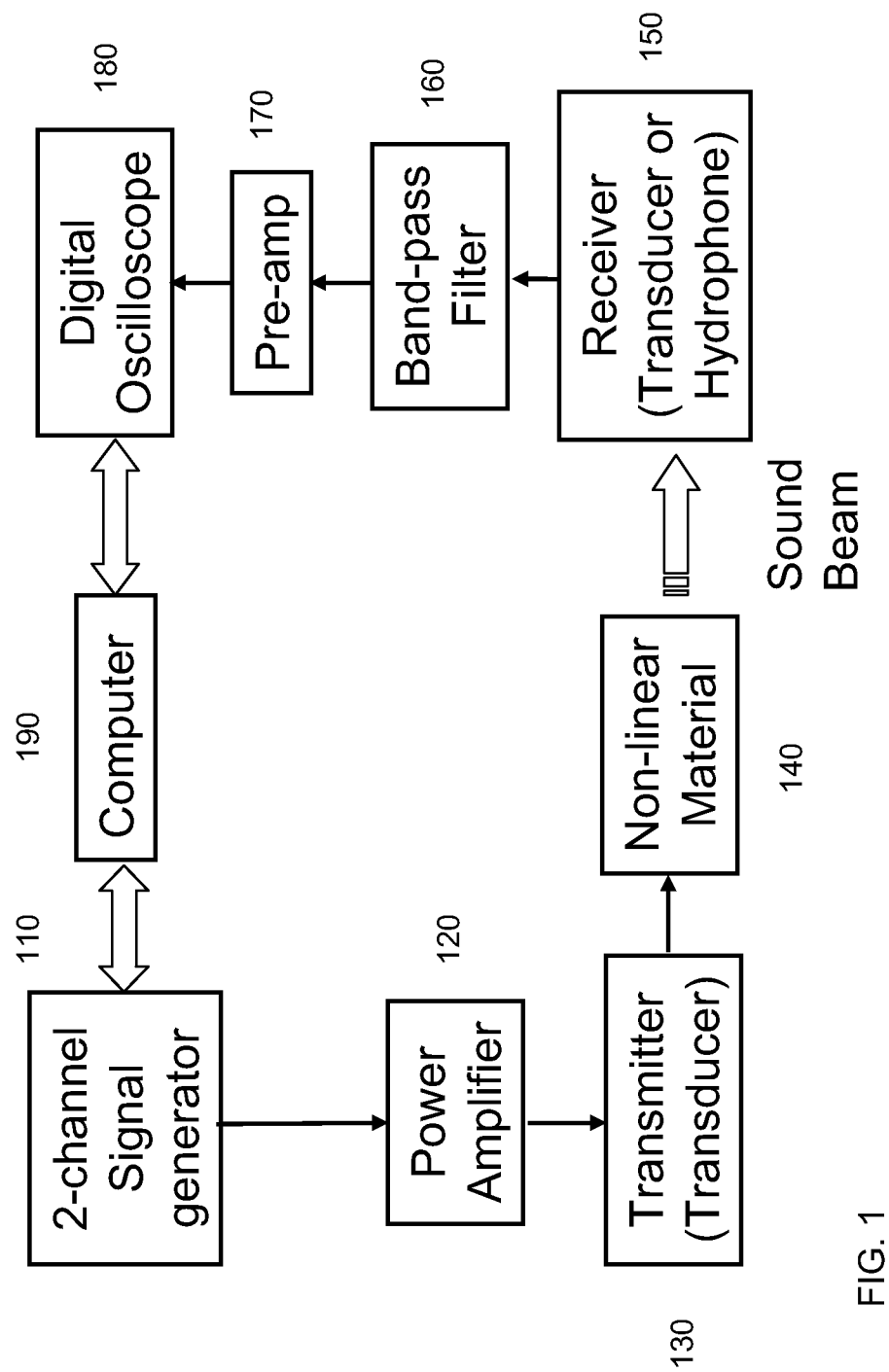
FIG. 1 shows a generalized diagram of an example device for producing the collimated beam in accordance with an aspect of the disclosure.

FIG. 1 shows a generalized diagram of the device for producing the collimated beam in accordance with an aspect of the invention. In some embodiments, one or more sources 110 are used to produce a first signal at a first frequency and a second signal at a second frequency. By way of a non-limiting example, the signals can be produced by a 2-channel signal generator. Similar signal or function generators may be used. The signals from the sources are received by one or more signal amplifiers 120 and are transmitted to one or more transducers 130 that are used to generate acoustic waves at the first and the second frequencies. The first and second frequencies can be broadband having a frequency range including a central frequency with some frequency spread about the central frequency. Piezoelectric transducers are one type suitable for this application. If more than one transducer is use, they can be arranged in an array configuration. By way of non-limiting examples, the array configuration can be linear, circular, a filled circle or a square array. The transducers within the array are divided into two groups, wherein the first group of transducers is driven by a source at the first frequency and the second group of transducers is driven by the source or by a different source at the second frequency. In some aspects of the invention, the source configured to generate the first frequency and the source configured to generate the second frequency drive all the transducers simultaneously. By way of a non-limiting example, the first frequency is 1.036 MHz and the second frequency is 0.953 MHz.

The acoustic signal is transmitted through a non-linear material 140 to generate a collimated acoustic beam by way of a non-linear mixing process. The non-linear material can be a liquid, a mixture of liquids, a solid, a granular material embedded in a solid casing, embedded microspheres, or an emulsion. By way of a non-limiting example of such a non-linear material is 310M ceramic foam sold by Cotronics of Brooklyn, N.Y., which is composed of over 99% pure fused silica ceramic and provides low thermal expansion and conductivity, high thermal shock resistance and high thermal reflectance. 310M has a density of 0.80 g/cm$^3$ and a speed of sound of 1060 m/s. Another non-limiting example of the non-linear material is a urethane foam board material. This type of foam is typically used for Computer Numerically Controlled (hereinafter, "CNC") machining. The CNC foam has a density of 0.48 g/cm$^3$ and a speed of sound of 1200 m/s.

The non-linear material 140 can be further be a material with high non-linearity, low acoustic velocity, low acoustic attenuation and high resistance to shock formation such that a highly collimated beam can be generated from a very compact source. Depending on the operating conditions in the borehole, other non-linear materials with suitable low sound velocity, high non-linear coupling, absorption length, shock wave length, temperature and pressure operating ranges and be selected to minimize the size of the mixing volume, as well as to meet other requirements required by operability specifications.

The dimensions and performance of the collimated beam source depend inter alia on certain properties of the non-linear material, and some limits on these may be defined. The non-linear parameter beta can be between 2 and 50. By way of example, beta for most liquids range between 2 and 10. Higher beta can be obtained from other solids materials. In some aspects, the beta can be 200 or higher for non-fluid non-linear materials. The sound velocity for non-linear liquids can be between 450 m/s and 1700 m/s at ambient conditions. In some aspects, the sound velocity of non-linear materials can be between 100 m/s and 800 m/s. Q or quality factor values tend not to be a limiting factor in liquids and can range from 280 for Dow Silicon Oil to tens of thousands for common liquids. In some embodiments, Q may be at least 30.

This non-linear behavior may be characterized through the analysis of the properties of P-waves resulting from the non-linear mixing phenomenon in which two incident waves at two different frequencies, $f_1$ and $f_2$, mix to generate third frequency components at the harmonics and intermodulation frequencies $f_2-f_1$, $f_2+f_1$, $2f_1$ and $2f_2$, etc. In an aspect of the invention, the non-linear collinear mixing phenomenon is designed to occur in the non-linear material inside the wellbore. In general, only the resulting third wave of difference frequency $f_2-f_1$ is of interest to this application. The higher frequencies only propagate a short distance and tend to be absorbed in the non-linear material itself.

The reflected, refracted and scattered acoustic energy is received by one or more receivers 150 located in either the same borehole where the collimated beam is produced or another borehole. For example, the one or more receivers can include one or more acoustic transducers, one or more hydrophones or another type of receiver or receivers suitable for the frequency range of interest. The received signal can be filtered by band-pass filter 160 and amplified by a pre-amplifier 170. The filtered and amplified signal can be displayed on a digitizer, such as a digital oscilloscope 180. The digital oscilloscope 180 can be controlled by a computer 190. The computer 190 can also be used to control the signal generator 110.

FIGS. 2a, 2b and 2c show different modes of generating the difference frequency in a non-linear material. The notations f, $f_1$ and $f_2$ refer to high frequency signals. The signals received from the source 110 and the power amplifier 120 by a transducer 210, enter a non-linear material 220. After a certain propagation length, the difference frequency is generated in the non-linear material 220. FIG. 2a shows the generation of a difference frequency $f_2-f_1$ by applying two different signals having two different frequencies $f_1$ and $f_2$ to the same transducer 210. FIG. 2b shows the generation of a difference frequency Δf by applying an amplitude modulated signal of frequency f and a modulation of Δf. FIG. 2c shows the generation of a difference frequency $f_2-f_1$ by applying two different signals having a first frequency $f_1$ to a first transducer 230 and a second frequency $f_2$ to a second transducer 240. The high frequency beams overlap in the non-linear material and produce the difference frequency $f_2-f_1$.

In accordance with the above, and by way of a non-limiting example, the first frequency is 1.036 MHz and the second frequency is 0.953 MHz. The collimated acoustic beam generated by the interaction with the non-linear material will have a frequency equal to the difference between the first frequency and the second frequency. In this example, the collimated acoustic beam has narrow frequency band with a clear dominant frequency of 83 kHz. In some embodiments, the collimated acoustic beam can have a relatively broad frequency range, wherein the first frequency is a single, narrow band frequency and the second frequency is swept across a broader range of frequencies. The first frequency may also be swept across a broad range of frequencies as well as the second frequency. In either case, the first frequency, the second frequency, or both can be a coded signal or an uncoded chirp. One benefit of coding the signal is signal to noise ratio improvement.

In some embodiments, the collimated beam is encoded with a time-varying code, which can be introduced into either the first or the second signal, or both. The time-varying code may include one or more of a variation in amplitude, a variation in frequency, and/or a variation in phase of the first, the second, or both the first and the second signals. The received time-varying code of the collimated beam can be used to measure a time-of-flight of the beam. Additionally, in some embodiments, the collimated beam can be broad-band if one of the primary frequencies is swept through a range of frequencies while the other is fixed. Thus, the resulting third beam $f_2-f_1$ will be swept across a wide frequency range.

FIG. 3 shows results of laboratory measurements in relation to theoretical predictions based on non-linear mixing and wave propagation theory. Acoustic waves are distorted by the nonlinear characteristics of the medium through which they propagate. The nonlinear propagation of acoustic waves can be modeled via the Khokhov-Zabolotskaya-Kuznetsov (KZK) equation, which can be solved by a finite difference approximate scheme. The KZK equation explains various nonlinear characteristics such as diffraction of sound pressure, attenuation of sound pressure (i.e. absorption), and generation of a harmonic frequency component (i.e. non-linearity), and models the shape of an acoustic signal as a sound pressure given such parameters as initial transmission sound pressure, transducer diameter and transducer array geometry, propagated distance, and medium. The KZK non-linear parabolic equation takes into account the combined effects of diffraction, absorption, and non-linearity in directive sound beams. The KZK equation for an axisymmetric sound beam that propagates in the positive z direction can be expressed in terms of an acoustic pressure p as follows:

$$\frac{\partial^2 p}{\partial z \partial t'} = \frac{c_0}{2}\left(\frac{\partial^2 p}{\partial r^2} + \frac{1}{r}\frac{\partial p}{\partial r}\right) + \frac{D}{2c_0^3}\frac{\partial^3 p}{\partial t'^3} + \frac{\beta}{2\rho_0 c_0^3}\frac{\partial^2 p^2}{\partial t'^2} \quad (1)$$

where $t'=t-z/c_0$ is a retarded time variable, t is time, $c_0$ is a small signal sound speed, $r=(x^2+y^2)^{1/2}$ is a radial distance from the z axis (i.e., from the center of the beam), $\partial^2/\partial r^2+(1/r)\partial/\partial r$ is the transverse Laplacian operator, and $\rho_0$ is the ambient density of the fluid. Furthermore, $$D = \rho_0^{-1}\left[\left(\varsigma + \frac{4\eta}{3}\right) + \kappa\left(\frac{1}{c_v} - \frac{1}{c_p}\right)\right]$$

is the sound diffusivity of a thermoviscous medium, where $\varsigma$ is the bulk viscosity, $\eta$ the shear viscosity, $\kappa$ the thermal conductivity, and $c_v$ and $c_p$ the specific heats at constant volume and pressure, respectively. The coefficient of non-linearity is defined by $\beta=1+B/2A$, where B/A is the parameter of non-linearity of the medium. The first term on the right-hand side of equation (1) accounts for diffraction (focusing) effects, the second term for absorption, and the third term for non-linearity of the attenuating medium. Further details on the form and use of the KZK model may be found in Y.-S. Lee, "Numerical solution of the KZK equation for pulsed finite amplitude sound beams in thermoviscous fluids," Ph.D. Dissertation, The University of Texas at Austin (1993), which is hereby incorporated by reference in its entirety.

Figure 3A:
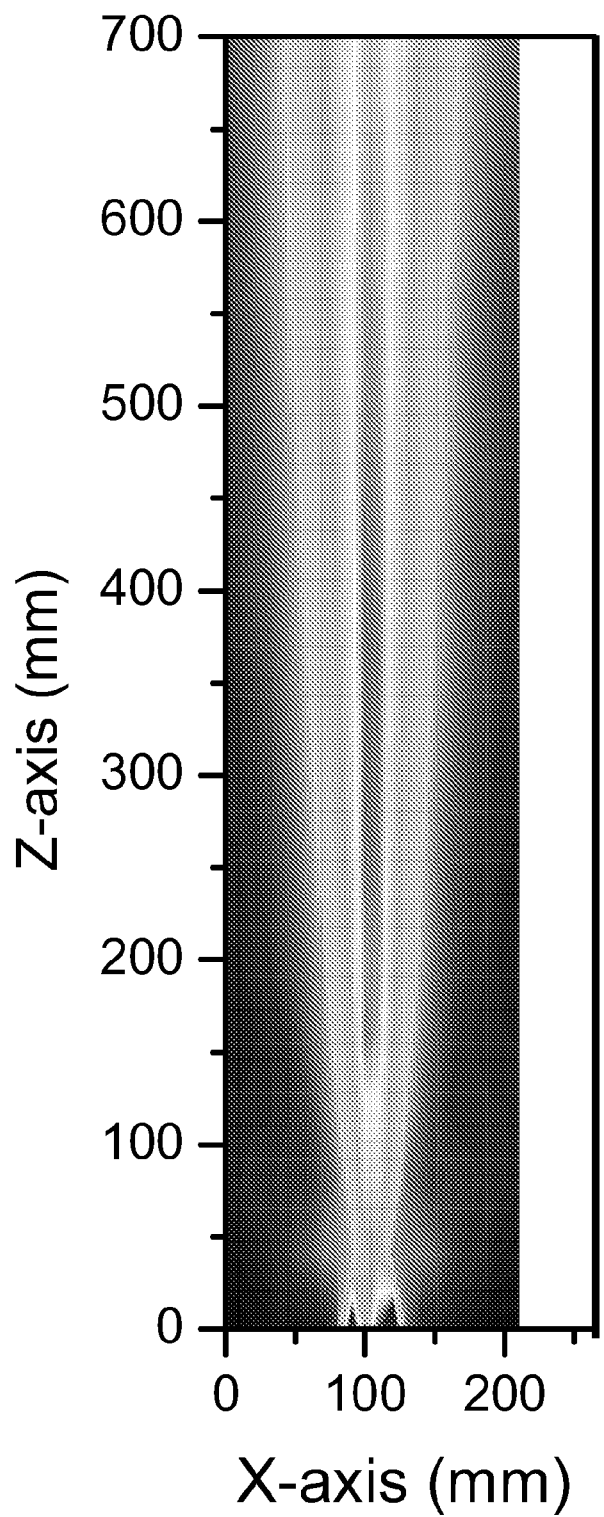
FIGS. 3a and 3b show comparisons of experimental results and theoretical predictions of the non-linear mixing in water in terms of the amplitude of the collimated beam and axial (z-direction) position.
Figure 3B:
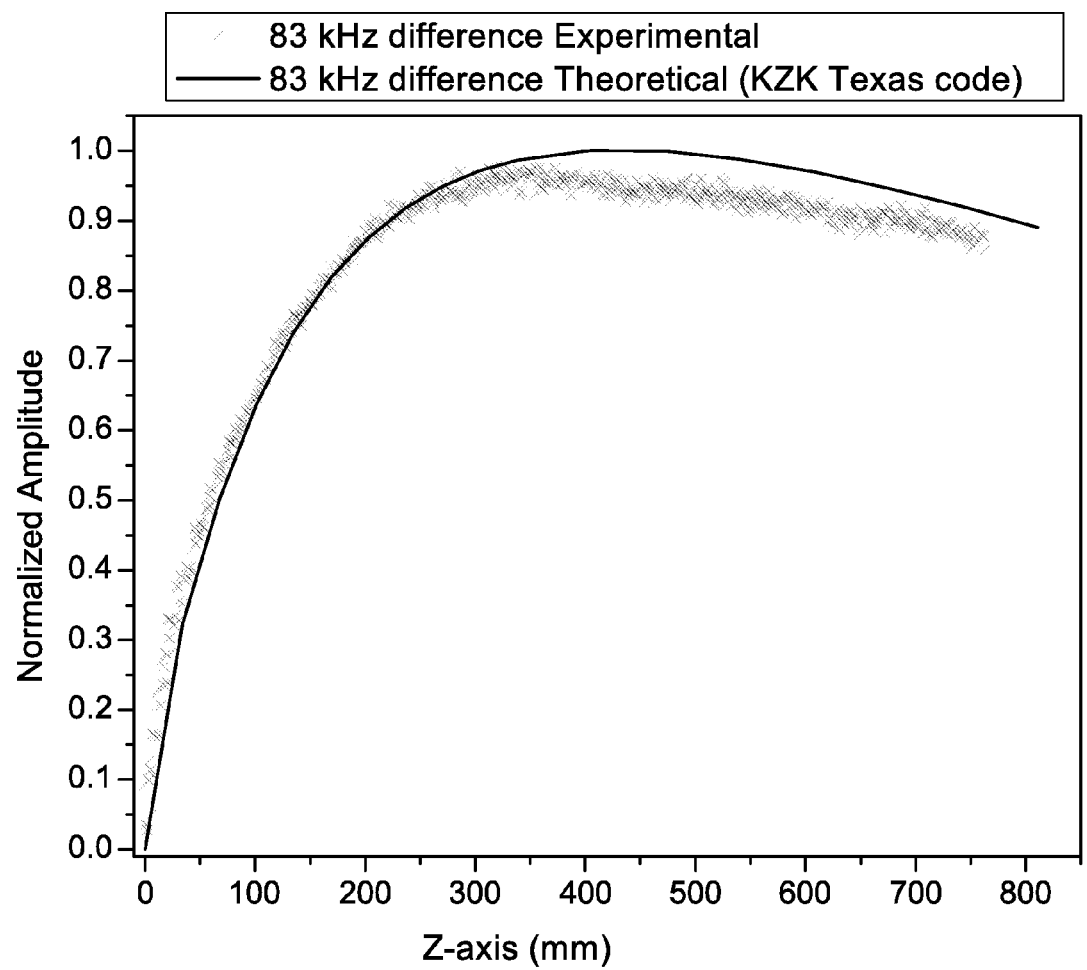

For the laboratory measurement, the transducer was excited at 0.953 MHz and 1.036 MHz leading to a collimated beam having a frequency equal to the difference 1.036 MHz-0.953 MHz=83 kHz. The collimated beam was produced by the non-linear mixing process using water as the non-linear material. FIG. 3a shows the amplitude of the generated beam for a range of z and x positions of a hydrophone receiver. FIG. 3b shows a plot of the observed axial intensity profile, in good agreement with theory.

Figure 4A:
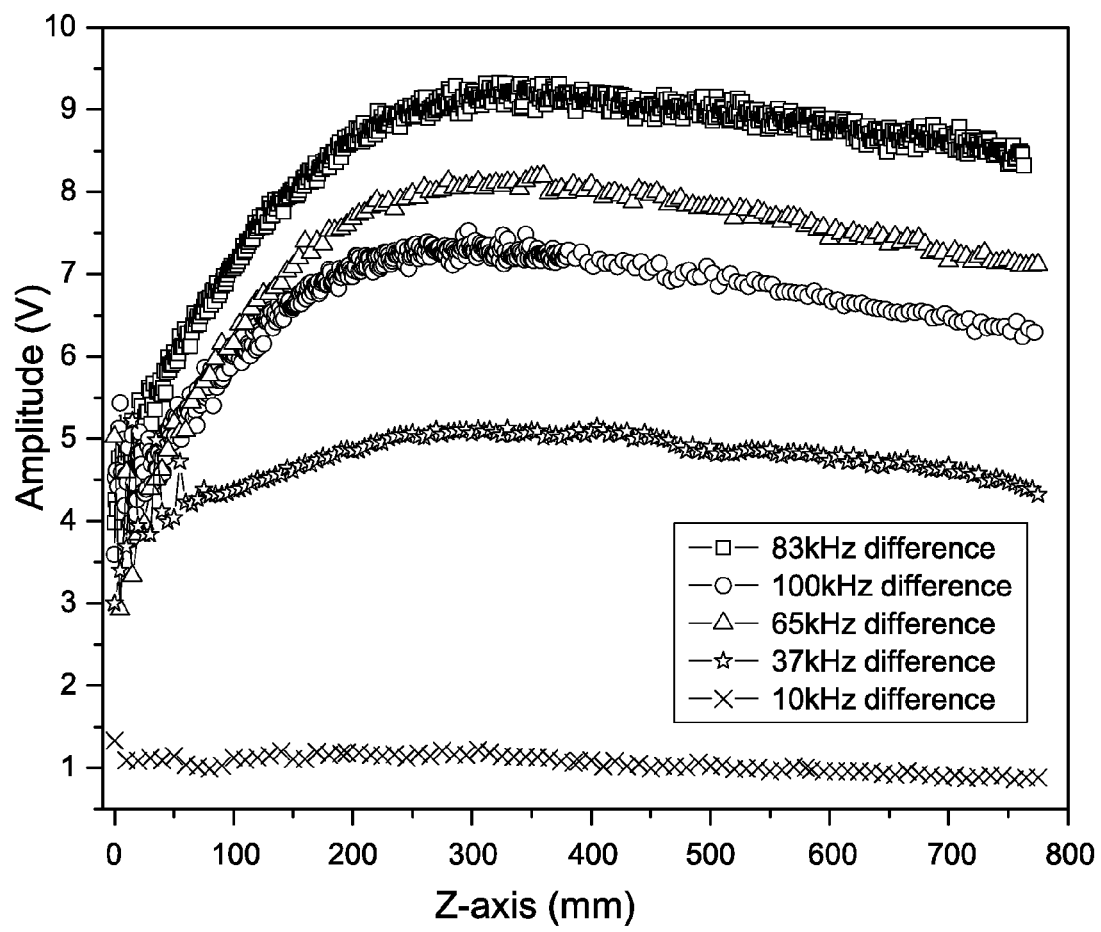
FIGS. 4a and 4b show experimental results of the non-linear mixing in water as the non-linear medium in terms of the amplitude of the collimated beam at various excited frequencies and axial (z-direction) and lateral (x-direction) positions.
Figure 4B:
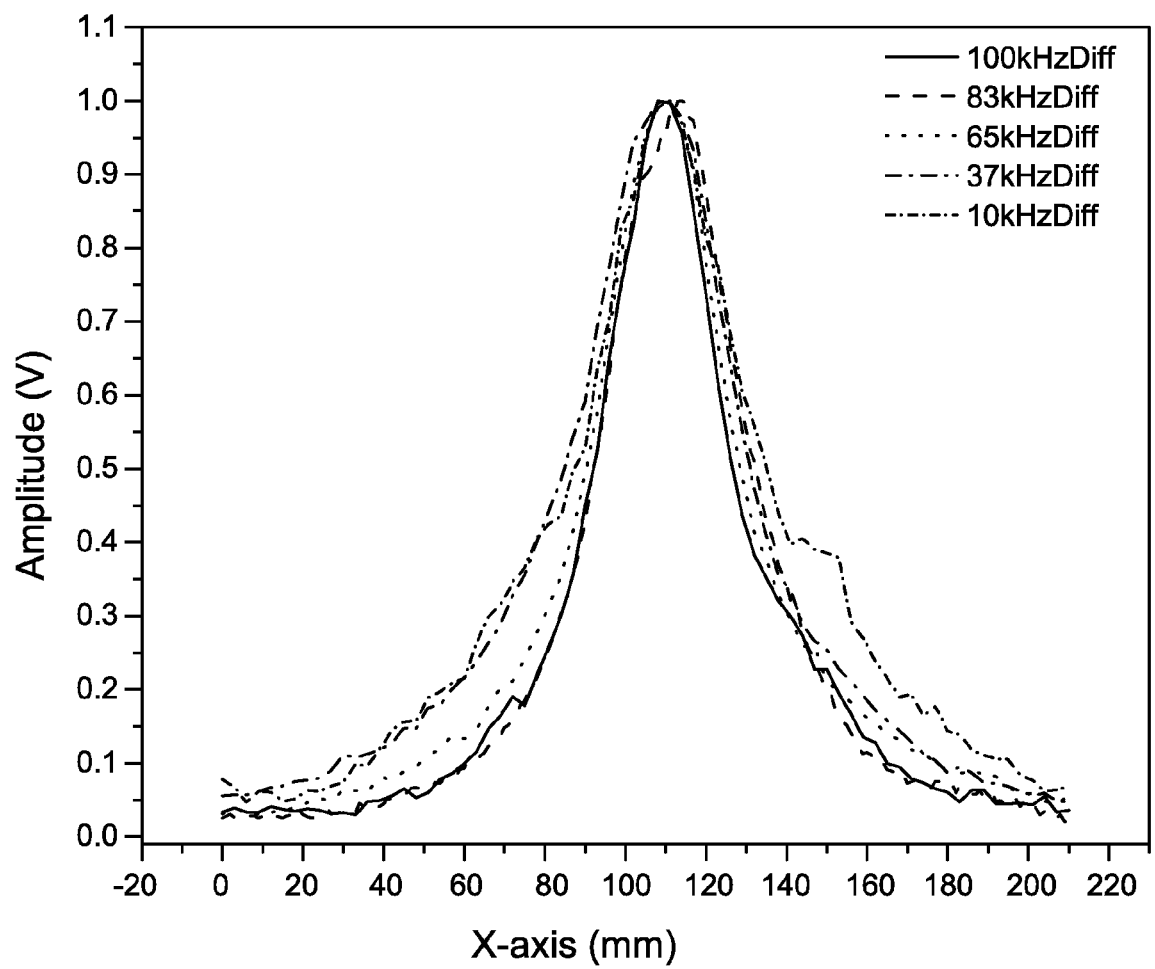

FIG. 4a shows the results obtained by exciting the transducers at a variety of different frequencies, and thus producing the collimated beam having a different frequency. The results are shown as a plot of amplitude as measured by a voltage, versus a position along the z-axis direction measured in millimeters. In this laboratory test, collimated beams were produced having at frequencies of 10 kHz, 37 kHz, 65 kHz, 83 kHz and 100 kHz. As can be seen in the figure, the collimated beams have similar beam profiles along the z-axis direction. FIG. 4b shows the beam cross section at a distance of 110 mm from the emitter. In this figure, the amplitude of the beam as represented by a voltage is plotted against the x-axis direction as measured in millimeters. The results indicate that the collimated beam at a variety of frequencies shows similar highly concentrated beam cross sections in the x-direction, unlike waves of the same frequency that would be more spread out in the x-direction.

As discussed above, the collimated beam can have a relatively narrow frequency range, wherein the one or more transducers are excited by a source producing a particular frequency, or the collimated beam can have a relatively broad frequency range. An example of the production of the collimated beam having a relatively broad frequency range is shown in FIGS. 5a and 5b. By way of a non-limiting example, FIG. 5a shows a chirp signal of finite duration that has a frequency ranging from 900 kHz to 1 MHz and a burst of a frequency of 1 MHz. FIG. 5b shows the resultant burst plotted as an amplitude as represented in voltage versus time in microseconds.

Figure 6A:
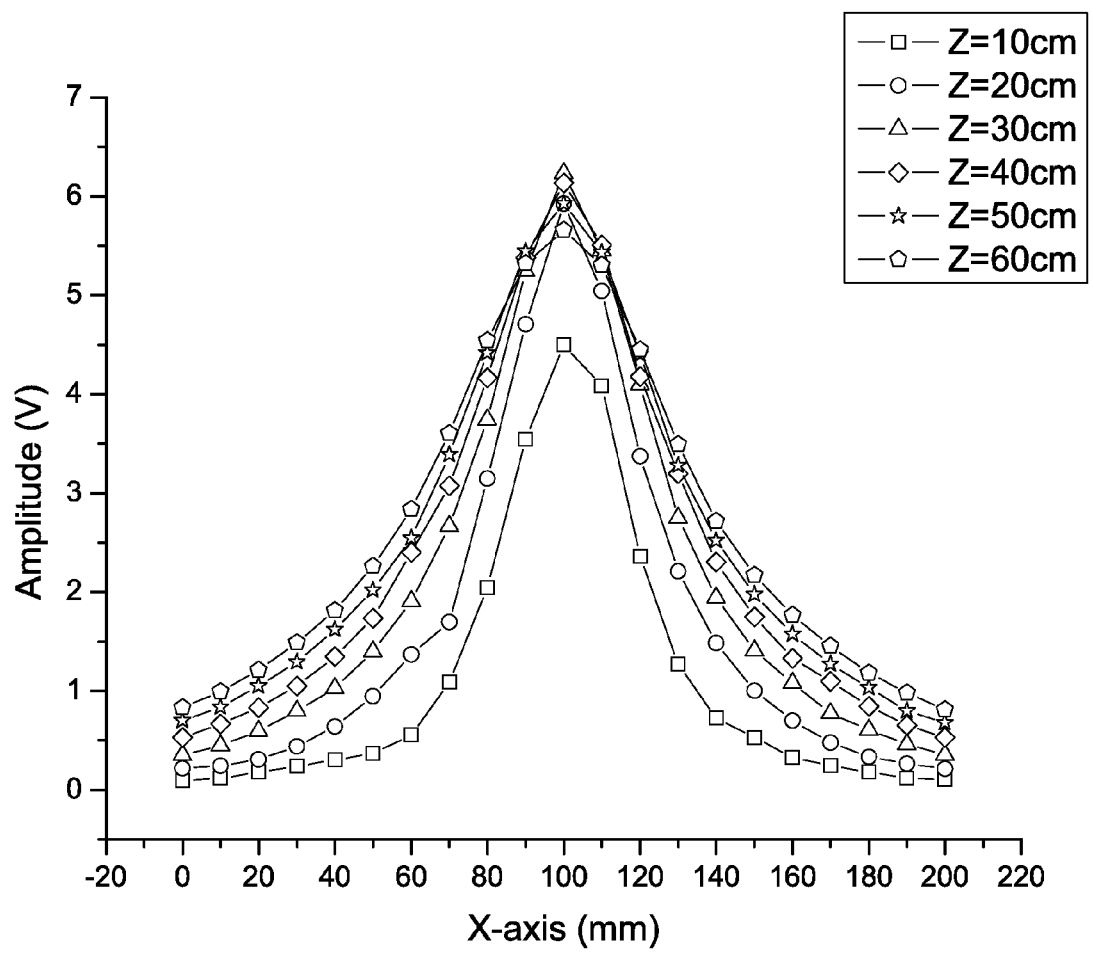
FIGS. 6a, 6b and 6c show an aspect of the disclosure where the collimated beam is produced by a chirp burst.
Figure 6B:
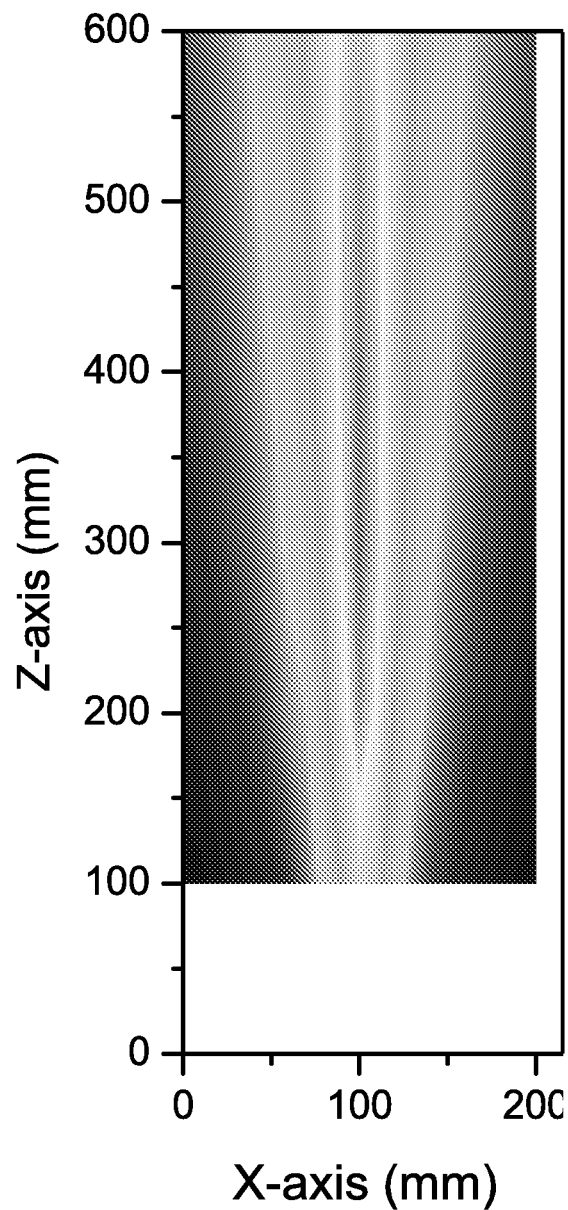
Figure 6C:
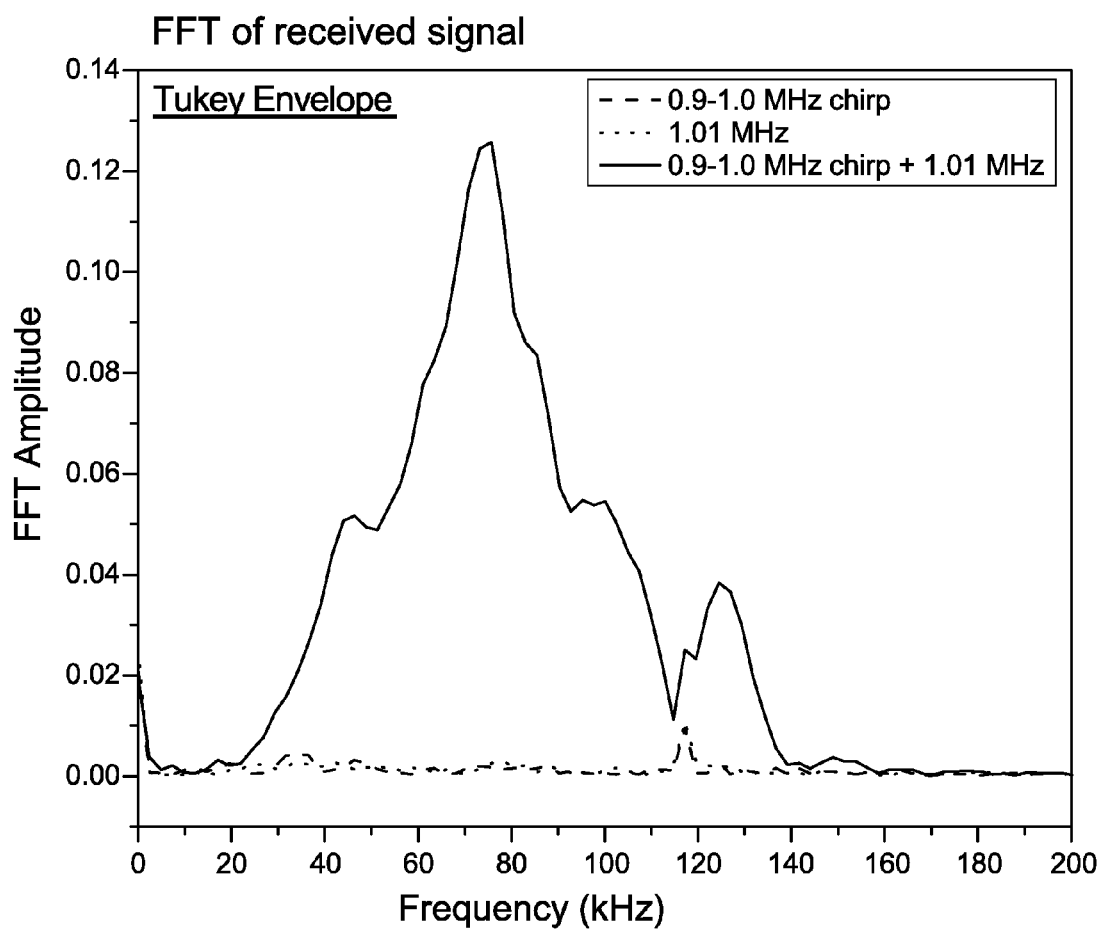

FIG. 6a shows a series of lateral scans at selected distances in the z-direction from the transmitter of the beam shown in FIG. 6b. The selected distances are 10 cm, 20 cm, 30 cm, 40 cm, 50 cm and 60 cm. The plot of amplitude as determined by voltage versus x-axis distance shows that the beam spread is small and relatively constant and independent of distance in the z-direction from the transducer. A frequency spectrum of the collimated beam is shown in FIG. 6c. The figure shows that the usable frequency range for this particular arrangement is from 20 kHz to 120 kHz. The low end of the usage frequency range can be as low as 5 kHz and is only limited by the size of the borehole. Other frequency bands may be used for the collimated beam including the acoustic logging frequencies that are typically in the kHz range and the borehole televiewer-type band that are typically in the hundreds of kHz to MHz range. One benefit of such an arrangement is that the use of a wide bandwidth chirp signal source in a borehole would tend to result in an improved signal to noise ratio in comparison with a non-chirped source. The chirped signal further may allow for an improved time-delay estimation that would be beneficial in imaging applications.

Figure 7A:
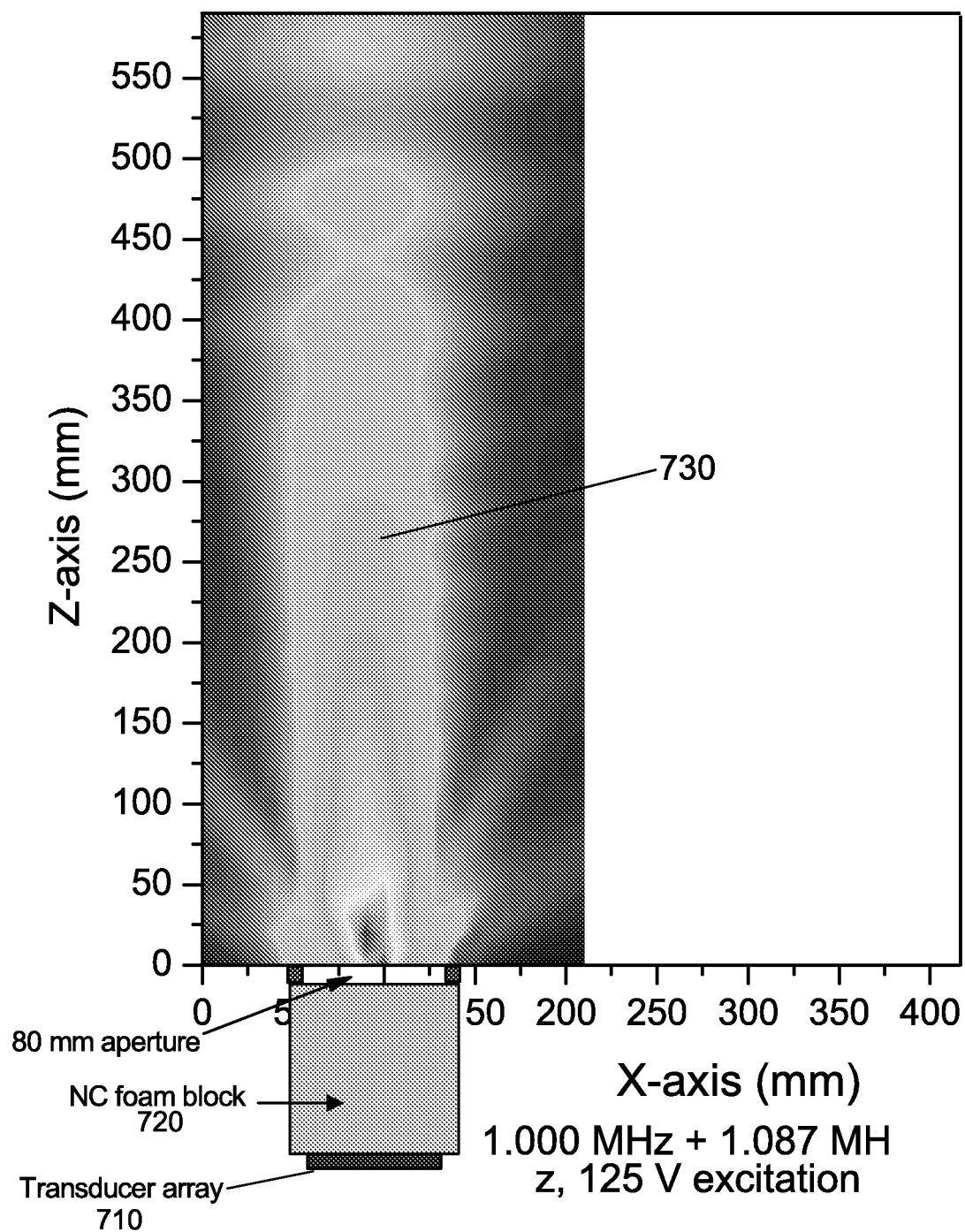
FIGS. 7a, 7b and 7c show an aspect of the disclosure where the collimated beam produced by the non-linear mixing process using a CNC foam block.
Figure 7B:
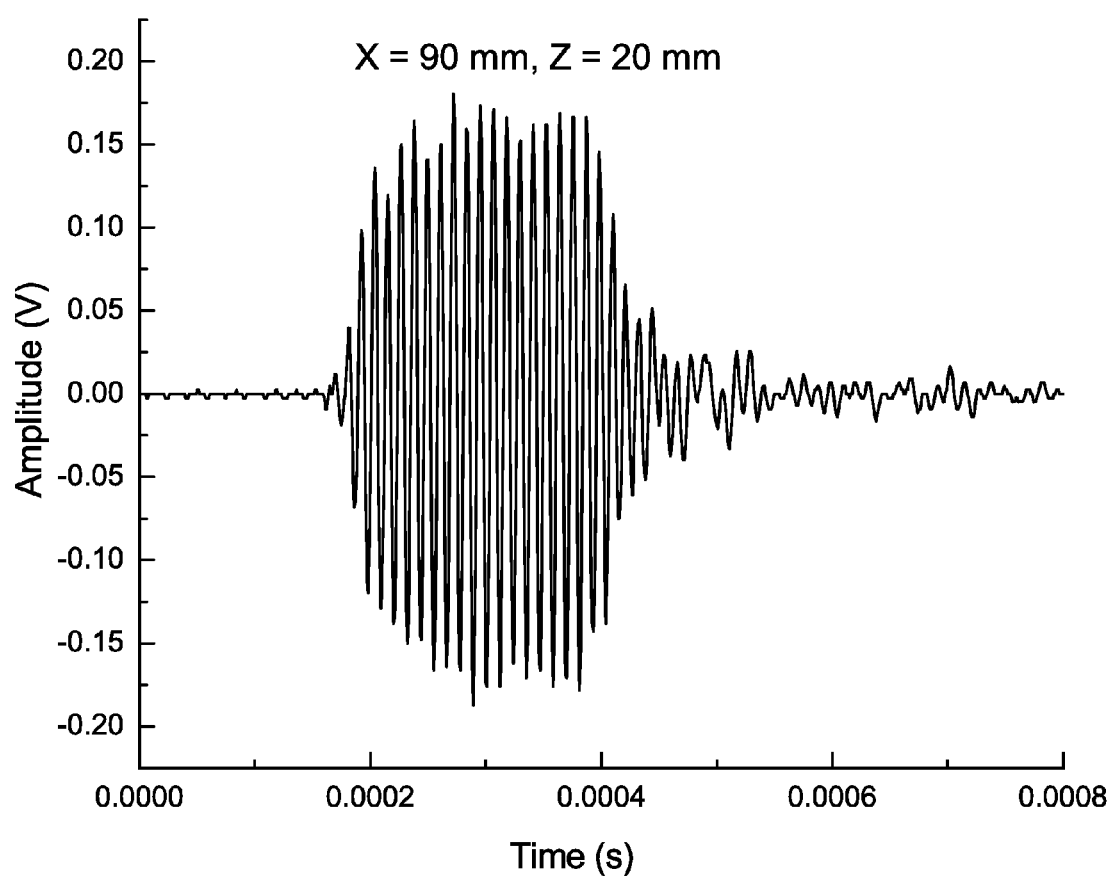
Figure 7C:
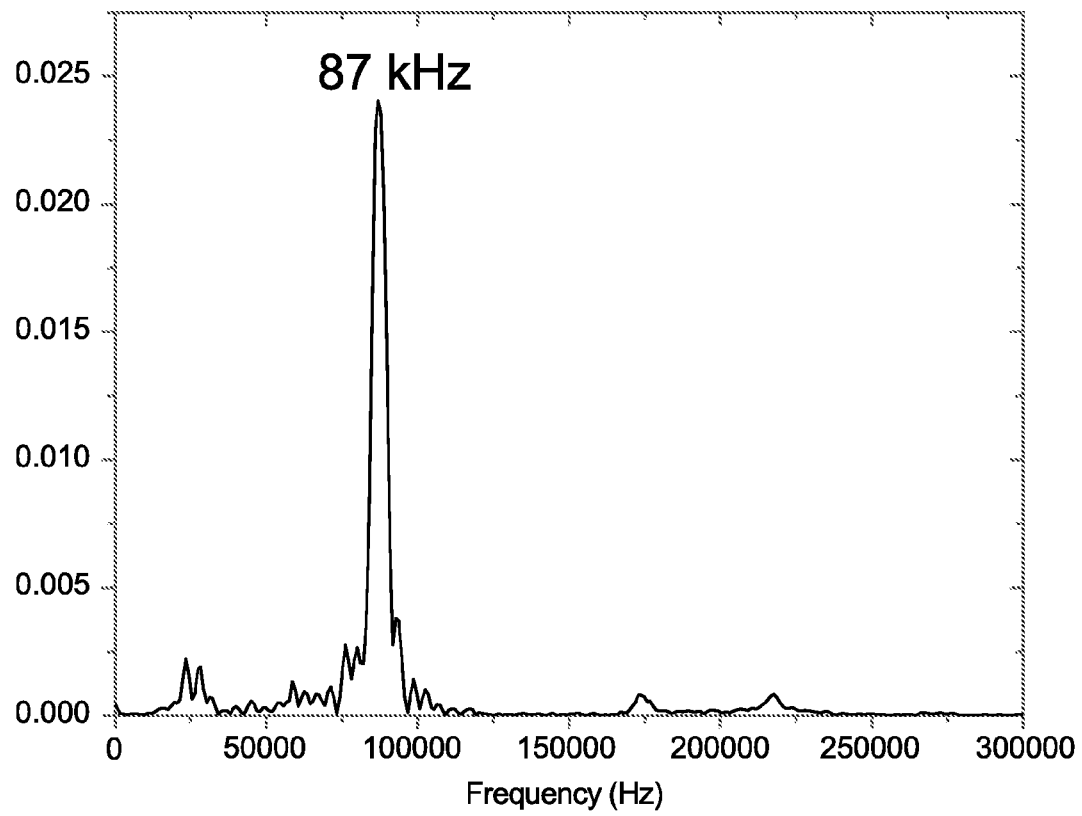

FIG. 7a shows the collimated beam produced by the mixing process using the CNC foam block as the non-linear material. A transducer array 710 is configured to produce acoustic wave at frequencies of 1.000 MHz and 1.087 MHz. The transducer array 710 is coupled to the CNC foam 720 where the two acoustic signals mix forming a collimated beam 730 having a frequency of 87 kHz. The CNC foam block has an 80 mm aperture from which the collimated beam propagated. FIG. 7b shows the amplitude of the collimated beam in the time domain at a lateral distance of 90 mm (x-axis) and an axial distance of 20 mm (z-axis). FIG. 7c shows the collimated beam in the frequency domain having a strong peak at 87 kHz.

Figure 8:
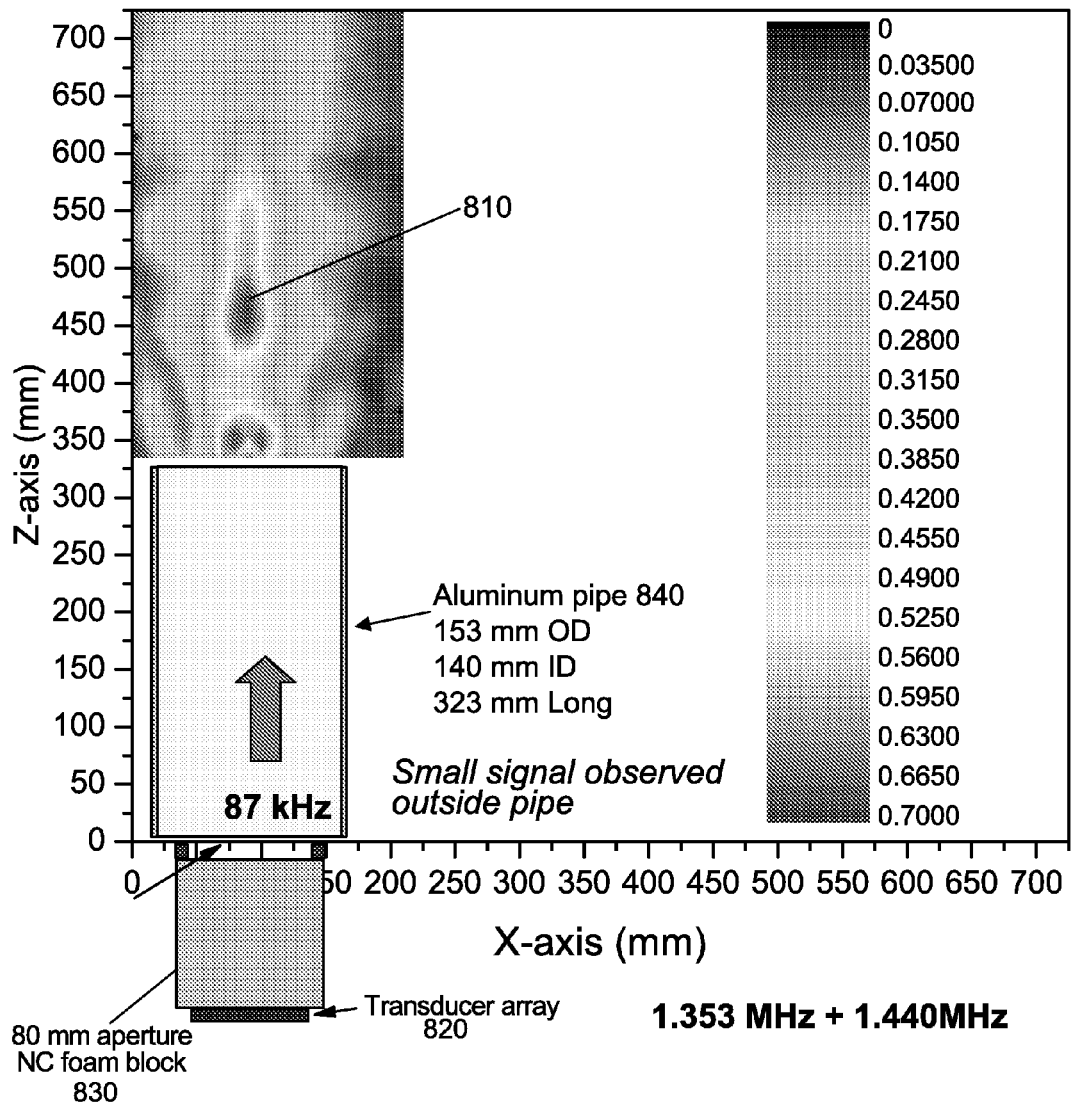
FIG. 8 shows an aspect of the disclosure where the collimated beam produced by the non-linear mixing process using a CNC foam block transmitted through an enclosed aluminum pipe.

FIG. 8 is similar to FIG. 7a, but shows the collimated beam 810 generated by the transducer array 820 and CNC foam block 830 arranged within an enclosure 840. As shown, the enclosure 840 is an aluminum pipe having an overall length of 323 mm, an internal diameter of 140 mm and an exterior diameter of 153 mm.

Figure 9:
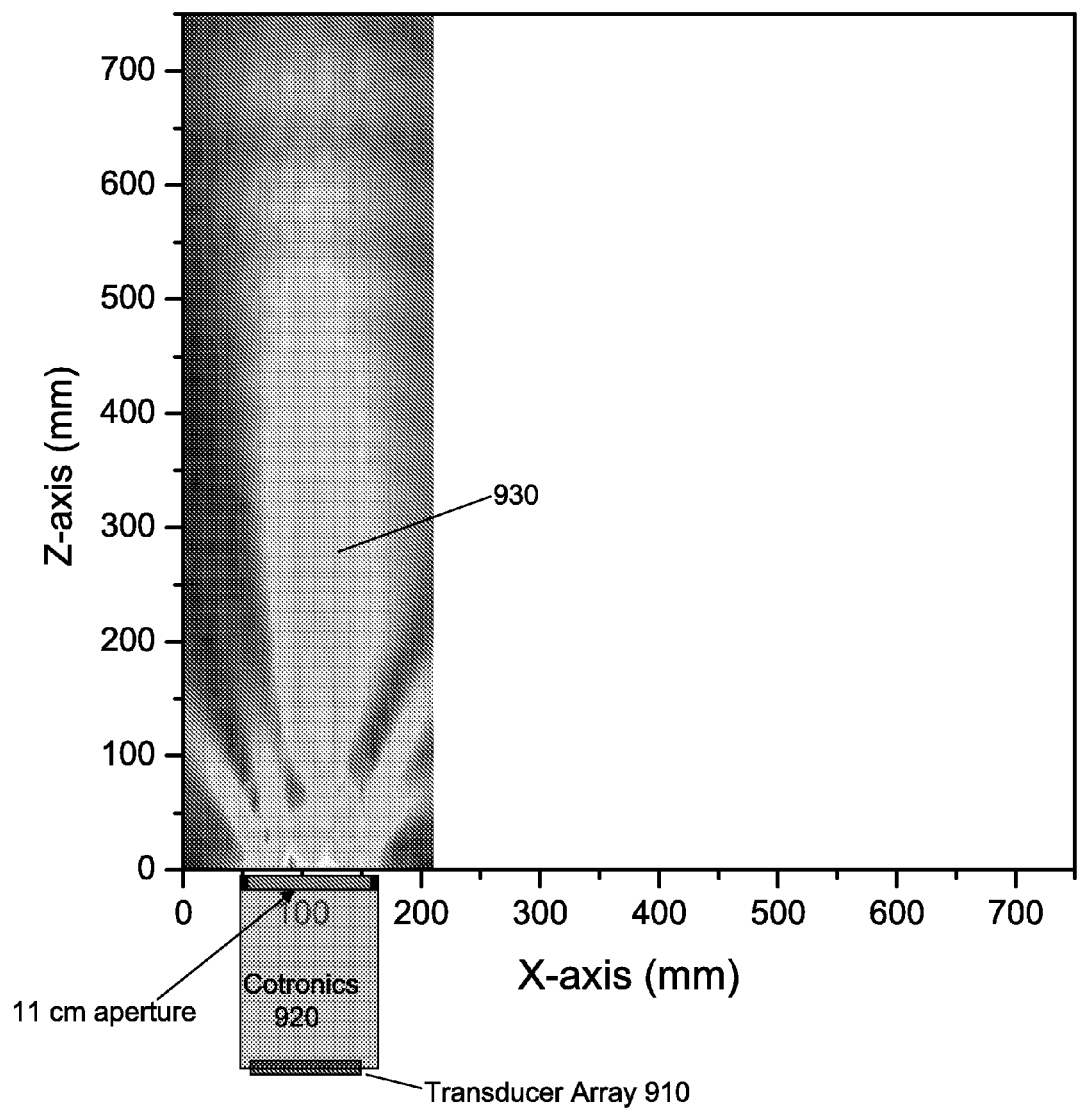
FIG. 9 shows an aspect of the disclosure where the collimated beam produced by the non-linear mixing process using the 310M ceramic block as the non-linear material.

FIG. 9 is similar to FIG. 7a and shows the collimated beam produced by the non-linear mixing process using the 310M ceramic block as the non-linear material. A transducer array 910 is configured to produce acoustic signals at frequencies of 1.353 MHz and 1.440 MHz. The transducer array 910 is coupled to the 310M ceramic block 920 where the two acoustic signals mix forming a collimated beam 930 having a frequency of 87 kHz. The 310M ceramic block 920 has a 110 mm aperture from which the collimated beam propagated. As can be seen in the figure, the collimated beam has side lobes that extend into the near field region at around a few centimeters from the aperture of the ceramic block; however, these side lobes do not extend into the far field region of the beam.

Figure 10:
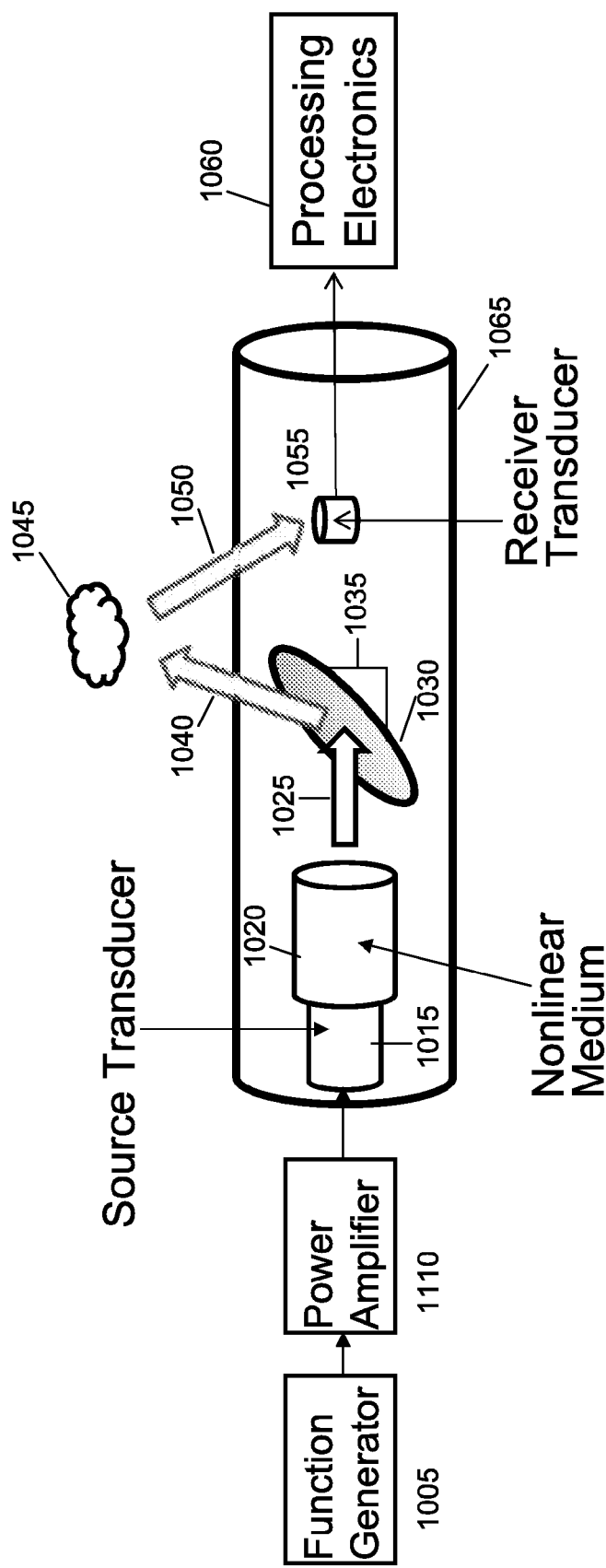
FIG. 10 shows an aspect of the disclosure where the device is used to characterize formations and/or materials near the borehole.

FIG. 10 shows an aspect of the invention where the device is used to characterize formations and/or materials near the borehole. One or more sources 1005 produce signals at a first and a second frequency. The signals are transmitted to a signal amplifier or amplifiers 1010 that are configured to increase the power of the signals. The signals modified by the amplifier 1010 are transmitted to one or more transducers 1015 that are configured to generate acoustic waves at the first and the second frequency. The acoustic waves are transmitted to a non-linear material 1020, which mixes the waves by way of the mixing process to produce a collimated acoustic beam 1025.

The collimated acoustic beam 1025 can be steered in a particular direction by a steering device, such as an acoustic beam guide 1030. The acoustic beam guide 1030 can be an acoustic reflector or an acoustic lens. The acoustic reflector can be a material with different acoustic impedance from the surrounding medium in which the beam propagates. One non-limiting example of such an acoustic reflector is metal plate. The acoustic lens is configured to focus the collimated acoustic beam at a particular focal point and direction and can have a concave shape. A Fresnel-type mirror arrangement can also be used for the acoustic beam guide. The acoustic beam guide can be rotated into a particular orientation by use of one or more actuators 1035 coupled to the guide, as shown in more detail in FIG. 11. In some embodiments, the acoustic beam guide 1030 may not be used, and the collimated beam would propagate along the axis of the borehole.

The collimated beam 1040 can be reflected off the guide 1030 and steered to a particular direction toward an object of interest 1045 near the borehole. Inhomogeneities of the formations, such as object 1045 or an adjacent bed located along the beam will generate reflection or scattering of the acoustic beam. In particular, acoustic impedance contrasts due to local inhomogeneity, planar fractures etc. outside the borehole cause reflection or scattering of the acoustic beam, some of which will return to the borehole. In a cased hole, energy is reflected from the inner wall of the casing, the outer wall of the casing that may or may not be attached to cement, any voids in the cement, the cement or fluid interface to the formation, and any additional concentric casing strings. In an open hole application, energy is reflected from impedance boundaries due (for example) to drilling induced formation mechanical alteration, fluid invasion, natural fractures, nodules of secondary minerals and bed boundaries. The reflected and scattered waves 1050 are received by one or more receivers 1055 in the same borehole (for the case of single well imaging) or in another borehole (for the case of cross-well imaging). The receivers 1055 can be coupled to the guide 1030, so that the receivers are configured to receive the reflected waves 1050 as the guide 1030 moves. The signals received by the receivers 1055 can be transmitted to processing electronics 1060 for analysis. The processing electronics 1060 can include a computer with appropriate software for characterizing the rock formation, including producing 2D or 3D images of the formation. The downhole instrumentation is housed in an enclosure 1065 to permit standard well logging operations.

In some aspects of the invention, the entire device including the transducers 1015, the non-linear material 1020 and receivers 1055 can be moved up and down the length of the borehole to image a particular formation near the borehole. Moreover, the entire device with or without the receivers 1055 can be rotated around the axis of the borehole to image formations in any azimuthal direction around the borehole.

Figure 11:
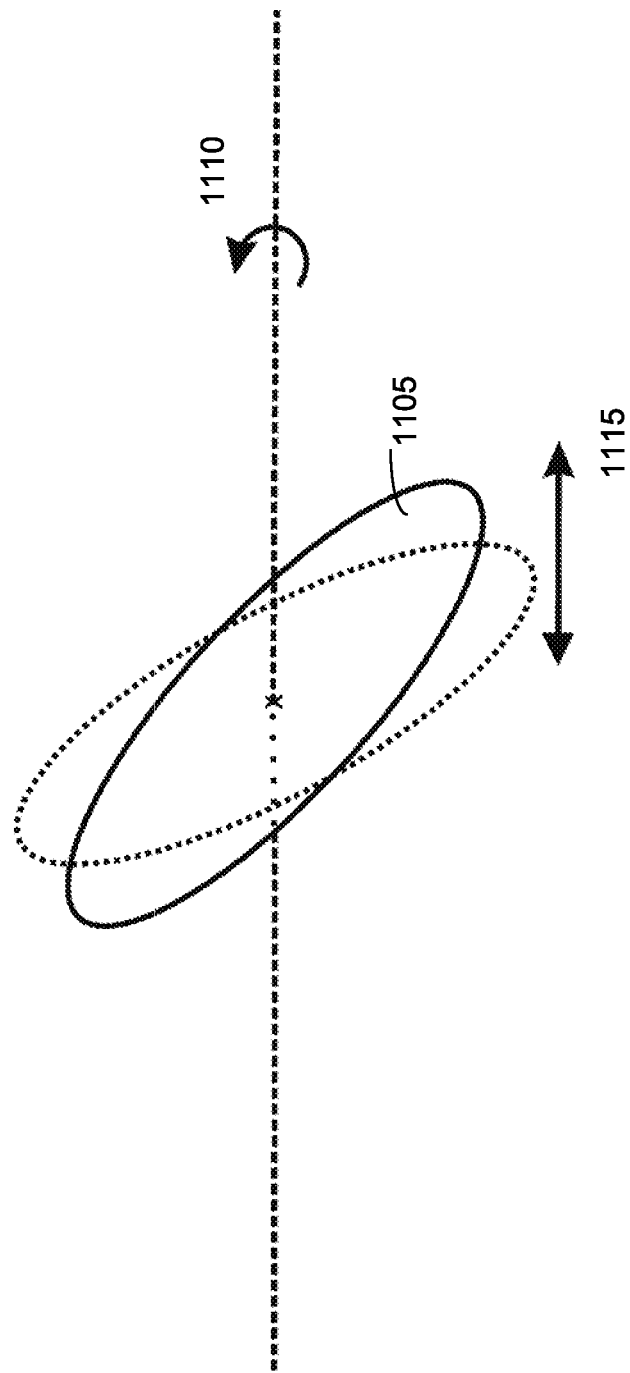
FIG. 11 shows the corresponding axes of rotation of the acoustic beam guide in accordance with an aspect of the disclosure.

FIG. 11 shows the corresponding axes of rotation of an acoustic beam guide 1105. The direction of the collimated beam is steered by selectively controlling the azimuth of the guide by rotation around the guide axis 1110, and the inclination 1115, the angle between the plane of the front of the guide and the guide axis. By use of actuators (not shown) the plane of the guide can be effectively controlled in azimuth and inclination. The actuators can thus be used for steering or changing the direction of the collimated beam.

Figure 12:
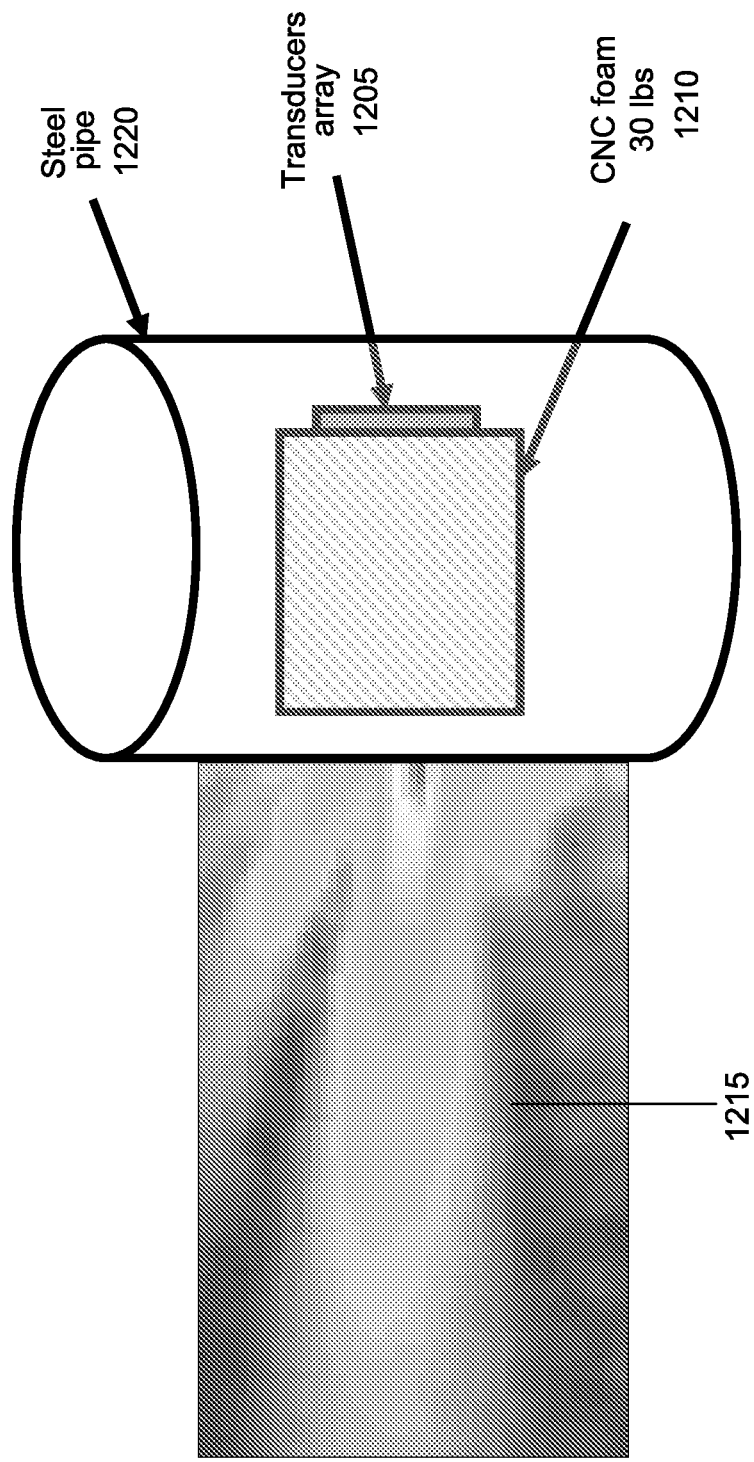
FIG. 12 shows an aspect of the disclosure where the collimated beam, produced by the non-linear mixing process using the 310M ceramic block as the non-linear material, penetrates a metal pipe casing.

FIG. 12 shows the collimated beam, produced by the non-linear mixing process using the 310M ceramic block as the non-linear material, penetrating a metal pipe casing. A transducer array 1205 is configured to produce acoustic signals having frequencies of 1.000 MHz and 1.087 MHz, for example. The transducer array 1205 is coupled to the 310M ceramic block 1210 where the two acoustic signals mix forming a collimated beam 1215 having a frequency of 87 kHz, which propagates through the metal pipe casing 1220. The transducer array 1205 can be rotated around the longitudinal axis of the borehole to image a formation around the borehole. The reflected or backscattered beam from the formation can be received by one or more receivers (not illustrated) in the borehole or in another borehole. The receivers can be coupled to the transducer array 1205 to rotate in a similar manner such that the reflected or backscattered beam is received by the receivers. As can be seen in the figure, the beam maintains its collimation after exiting the metal pipe casing 1220.

FIGS. 13a and 13b show the collimated beam after steering with an acoustical mirror and exiting the metal pipe casing. FIGS. 13a and 13b are similar to FIG. 12, with the difference that the non-linear material (water in this case) is producing the non-linear beam along the pipe and the beam is steered out of the pipe perpendicular to the initial propagation direction with the help of an acoustical mirror plate. A transducer array 1305 is configured to produce acoustic signals having a frequency of 0.953 MHz and 1.036 MHz, for example. The transducer array 1305 is coupled to a non-linear material (water) 1310 where the two acoustic signals mix forming a collimated beam 1315 having a frequency of 83 kHz, which reflects from the acoustical mirror 1320 and propagates through the metal pipe casing 1325. As can be seen in the figure, the beam maintains its collimation after exiting the metal pipe casing 1325, and can be easily steered by rotating the acoustical mirror in such a way that the angle of incidence of the collimated beam is changed. FIG. 13*b* shows the beam steering that results when the mirror 1320 has been rotated.

Figure 14:
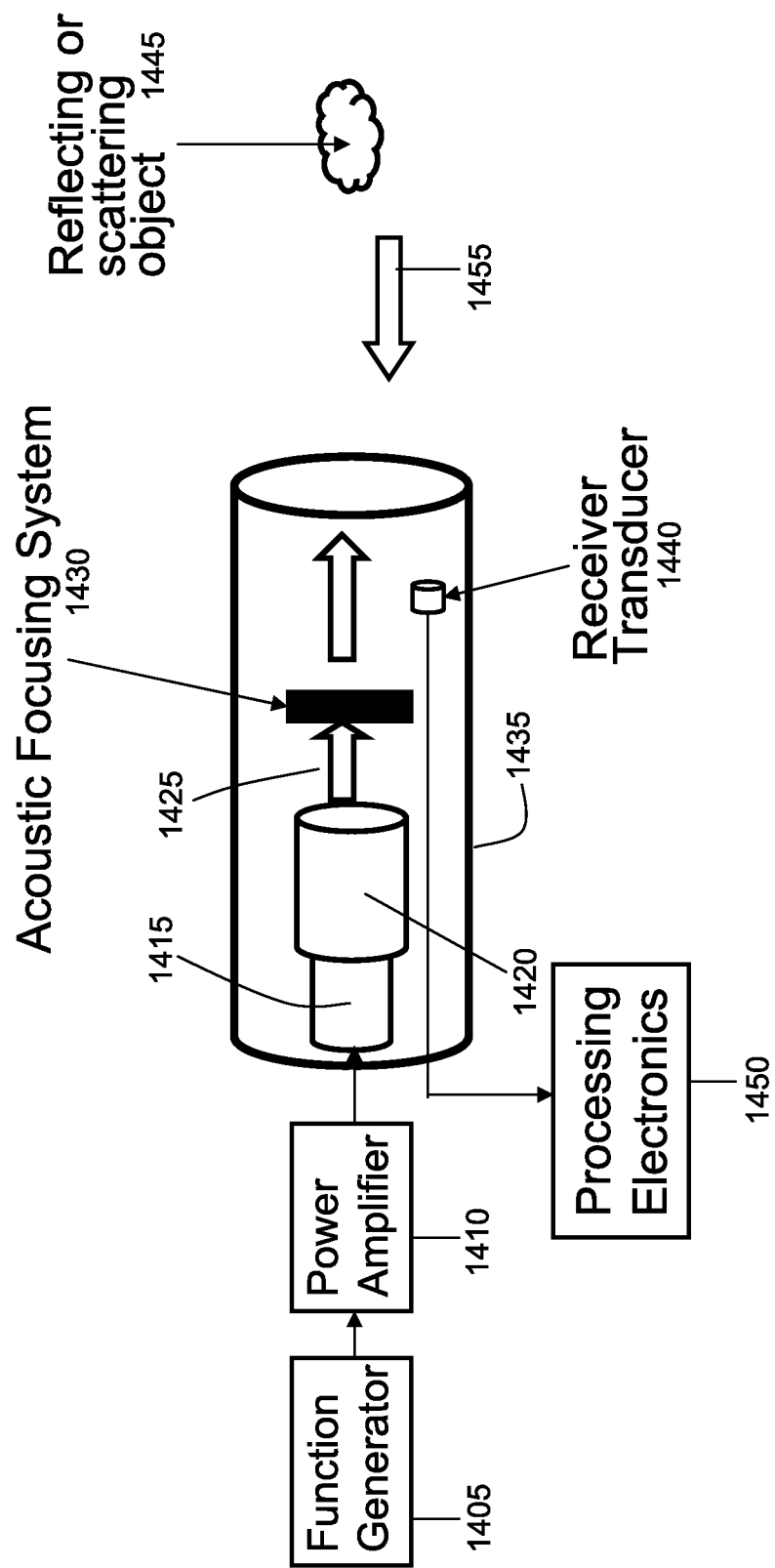
FIG. 14 shows an aspect of the disclosure where the device is used with or without an acoustic focusing system to look straight down a borehole.

FIG. 14 shows an aspect of the invention where the device is used with an acoustic focusing system. One or more sources 1405 produce signals at a first and a second frequency. The signals are transmitted to a signal amplifier or amplifiers 1410 that are configured to increase the power of the signals. The signals modified by the amplifier 1410 are transmitted to one or more transducers 1415 that are configured to generate acoustic signals at the first and second frequencies. The acoustic signals propagate to a non-linear material 1420, which mixes the signals by way of the mixing process to produce a collimated acoustic beam 1425.

In some embodiments, the collimated acoustic beam 1425 is incident on an acoustic focusing system 1430. The collimated beam tends to have a certain beam spread, which increases as the beam propagates through the enclosure (i.e., pipe). This beam spread means that at a certain distance from the beam origin, the beam will interact with the walls of the enclosure, which tends to produce undesirable effects. The acoustic focusing system 1430 reduces this interaction of the beam and the enclosure walls by focusing the beam, and thus reducing the beam spread. The focusing need not reduce the beam profile to a point, but merely produce a well defined beam that is not distorted or attenuated due to the reflections from the walls of the enclosure, such that the beam profile does not spread too much angularly. One non-limiting example of the acoustic focusing system 1430 is a Fresnel lens made of Plexiglass or other materials that when appropriately shaped reduces the beam spread. The acoustic focusing system 1430 can include a variety of materials including a chamber filled with a liquid of different sound speed than the non-linear material in the enclosure, where the chamber is properly shaped, either convex or concave depending on the liquid sound speeds. In general, any material that is reasonably matched in acoustic impedance with that of the non-linear material in the enclosure can be used as the acoustic focusing system 1430.

In some embodiments, the acoustic focusing system 1430 is not used when the beam 1425 produced by the non-linear mixing in the material 1420 is sufficiently well-defined and does not spread too much angularly. In this case, the beam 1425 exits the material 1420 without having been further modified.

A housing or enclosure 1435 is configured to house and support the transducers 1415, the non-linear material 1420, the acoustic focusing system 1430, and one or more receivers 1440. The focused acoustic beam is directed along the axis of the housing 1435 and is reflected or scattered from an object of interest 1445. The object 1445 can include inhomogeneities in the rock formation such as invaded zones, the cement bond with casing, damaged zones, fractured zones, stratigraphic layering (particularly at high apparent dip, i.e., for high angle wells in relatively low dip formations). The receivers 1440 are configured to receive the reflected or scattered signal 1455 and the signal is processed by processing electronics 1450.

Figure 15A:
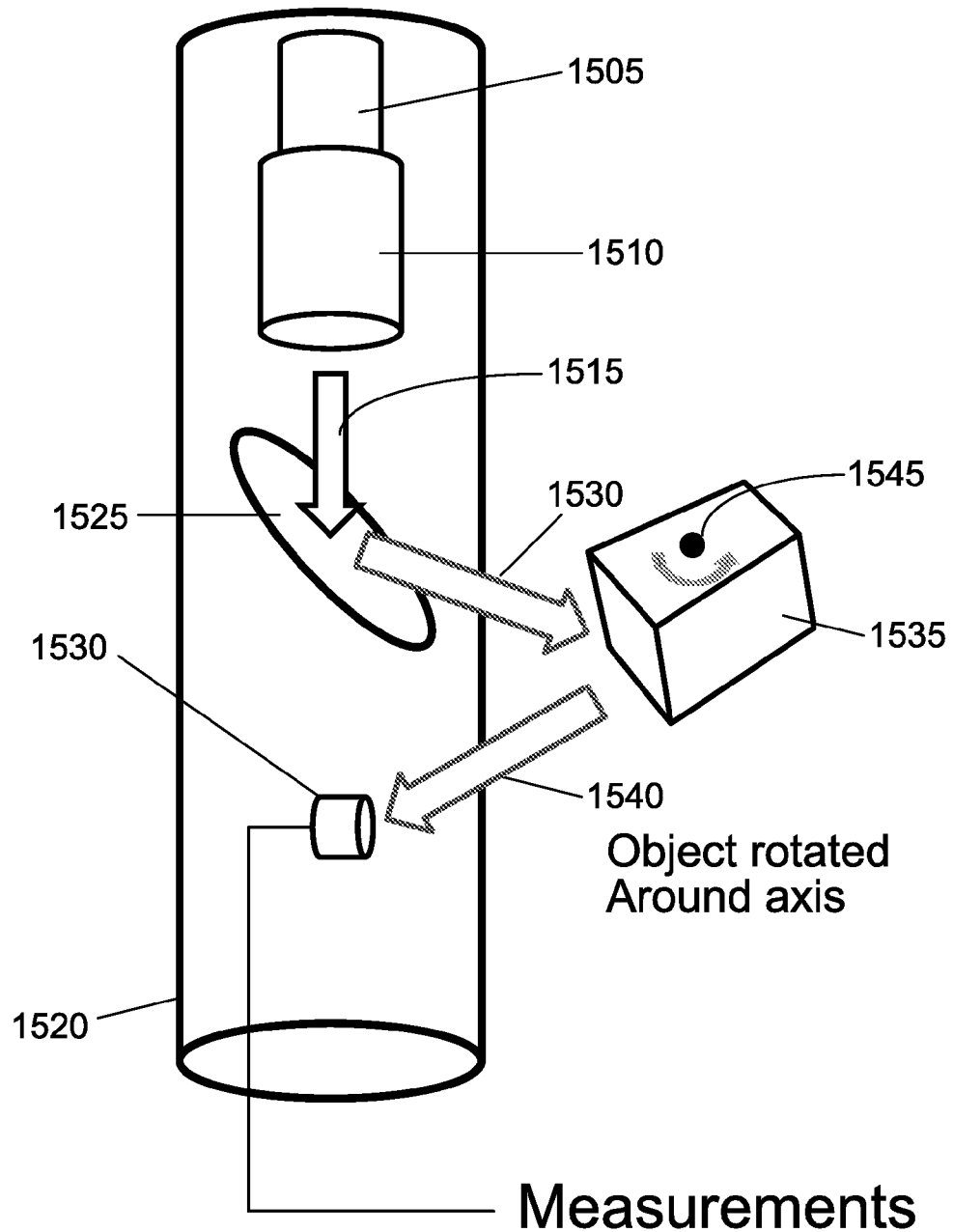
FIGS. 15a, 15b and 15c show an example experimental set-up and results of the imaging of an object outside the pipe in accordance with an aspect of the disclosure.
Figure 15B:
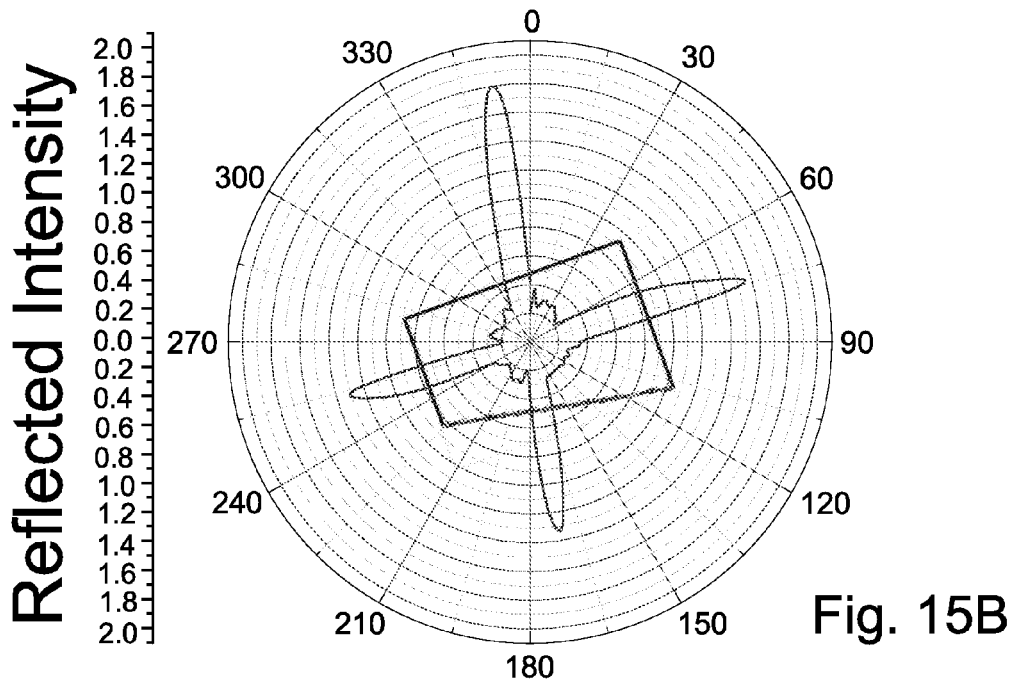
Figure 15C:
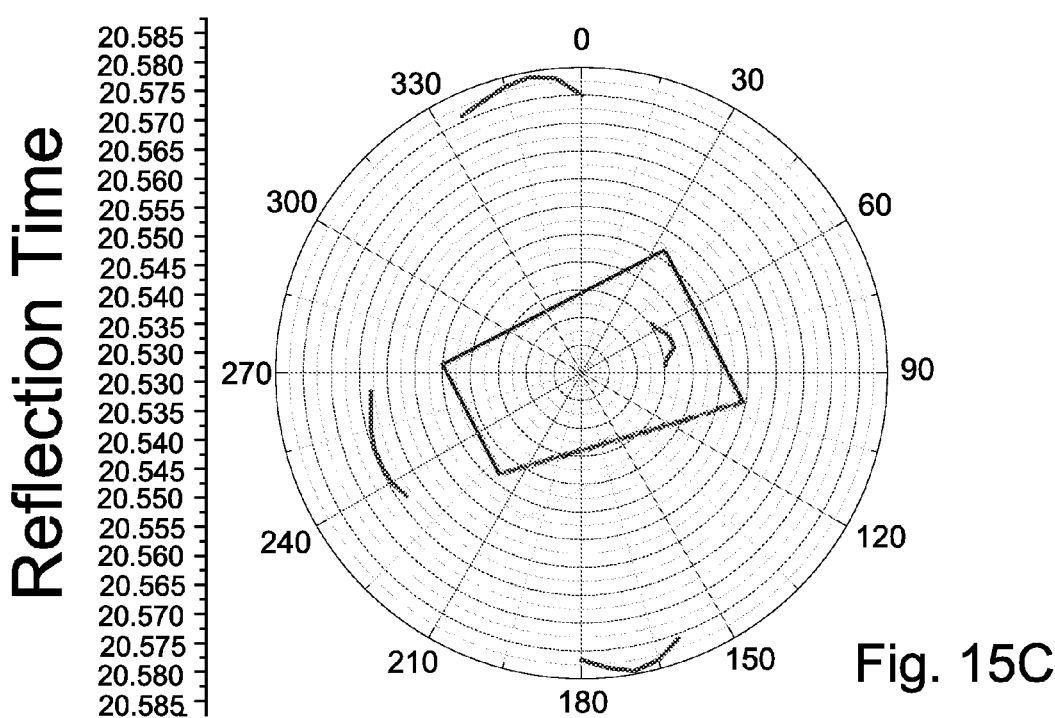

FIGS. 15*a*, 15*b* and 15*c* show an experimental set-up and results of the imaging of an object outside of the pipe in accordance with an aspect of the invention. FIG. 15*a* shows the experimental set-up that is similar in design to FIG. 10, wherein a source transducer 1505 is configured to generate acoustic signals and is coupled to a non-linear material 1510 that is configured to produce a collimated acoustic beam 1515 by a non-linear mixing process. The source transducer 1505 can be driven by a source generator and a power amplifier (both not shown). An enclosure 1520, such as a cylindrical housing, is configured to house the transducer 1505, the non-linear material 1510, as well as an acoustic beam guide 1525, and one or more receivers 1530. The collimated acoustic beam 1515 is directed out of the enclosure 1520 by the acoustic beam guide 1525. By way of non-limiting example, in this arrangement, the acoustic beam guide 1525 is an acoustic reflector. The reflected collimated beam 1530 is incident on an object 1535 outside of the enclosure 1520. The object 1535 can include inhomogeneities in the rock formations such as invaded zones, the cement bond with casing, damaged zones, fractured zones, stratigraphic layering (particularly at high apparent dip, i.e., for high angle wells in relatively low dip formations). The collimated beam 1540 is received by the one or more receivers 1550 (either located in the same borehole or in another borehole) after is has reflected or backscattered from the object 1535.

In the experimental set-up of FIG. 15*a*, the object was rotated 360° about an axis 1545 and measurements were made of the sound intensity as recorded by receivers 1550. In this set-up, the object 1535 was a solid block of aluminum with a slightly irregular shape, placed approximately 61 cm from the pipe wall. Both the pipe and the block were immersed in water. FIG. 15*b* shows a polar plot of the measured reflected intensity and FIG. 15*c* shows a polar plot of the measured reflection time. In both FIGS. 15*b* and 15*c*, the cross-section of the aluminum block is shown for comparison with the measured data. As shown in FIG. 15*b*, there is a large signal when the face of the block is in a position maximizes the reflected signal at the receiver. Thus, each peak represents a face of the block. FIG. 15*c* shows the time-of-flight. As the block is rotated, the faces come forward and recede, changing the total distance the sound beam has to propagate. It is understood that in the borehole configuration, the intensity image will be obtained by rotation of the device. Thus the amplitude of the reflected signal represents reflections from inhomogeneities around the perimeter of the borehole.

The device can be made to be very compact while generating low frequency collimated beam with broad bandwidth from 20 to 120 KHz by choosing a non-linear material 140 with low acoustic velocity, high non-linearity, low attenuation and high resistance to shock formation. Depending on the operating conditions in the borehole, other non-linear materials with suitable low sound velocity, high non-linear coupling, absorption length, shock wave length, temperature and pressure operating ranges may be selected to minimize the size of the mixing volume, as well as to meet other requirements required by operability specifications. By way of another non-limiting example, the non-linear material can be FLUORINERT FC-43, which is a trademark for an inert liquid used for applications in electronics sold by 3M Corporation of St. Paul, Minn. FLUORINERT FC-43 is a suitable fluid for acoustic nonlinear mixing due to its low sound speed (646 m/s) and its high acoustic nonlinear parameter $\beta$ of 7.6. Other fluids from the Fluorinert family can also be used as they all have similar physical properties. Fluorinert is stable from a chemical and thermal point of view, compatible with sensitive materials and practically non-toxic. Its dielectric strength is about 10 times higher than air, which results in its safe use at high excitation powers required in non-linear acoustic applications. Its usual use is in immersion thermal cooling for electronic components susceptible to high-temperature damage.

Figure 16:
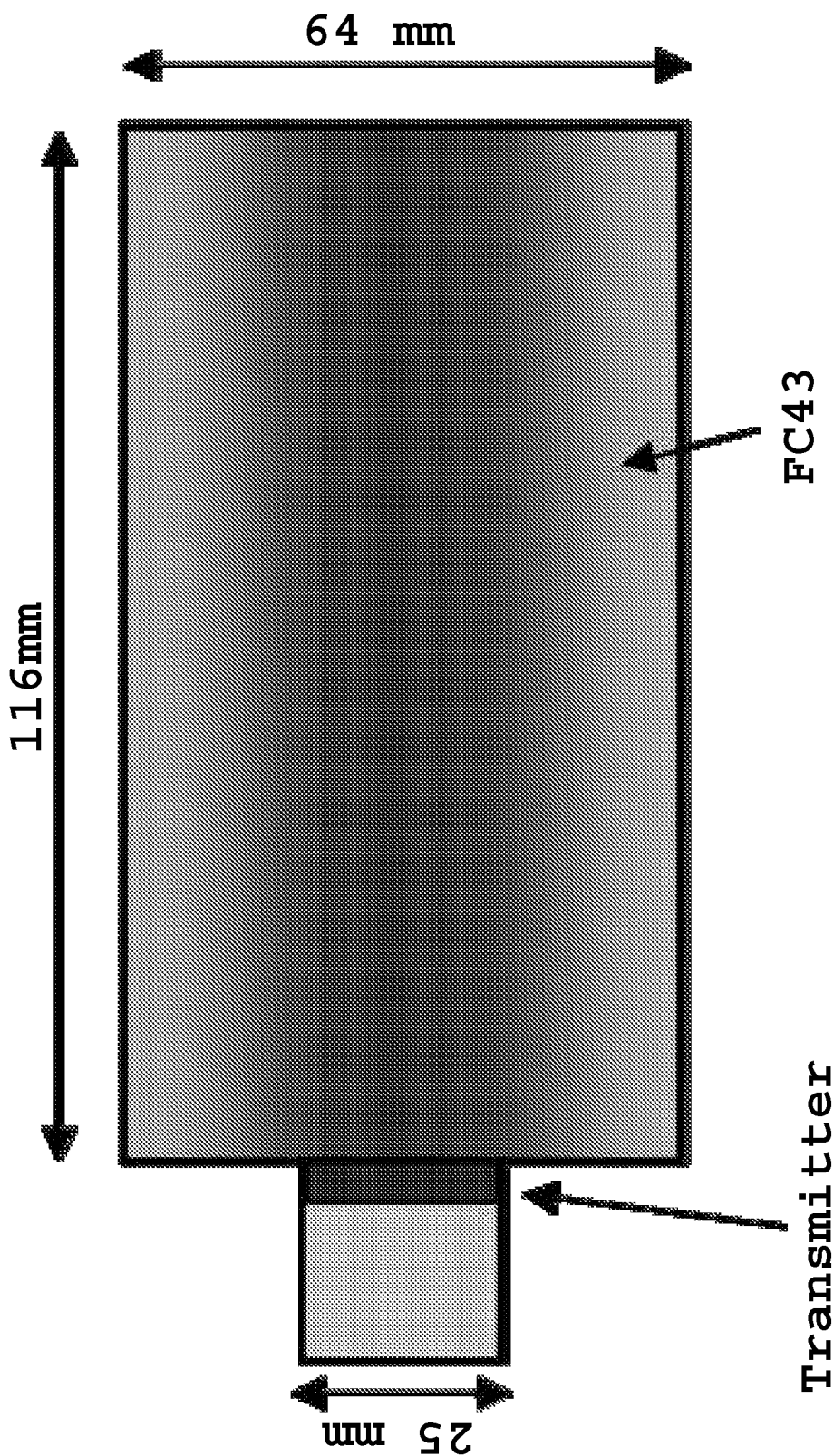
FIG. 16 shows the dimensions of a very compact source device, with transducers and a chamber of low acoustic velocity (646 m/s) non-linear mixing fluid such as Flourinert FC-43, capable of generating a collimated acoustic beam with bandwidth of 20-120 kHz in accordance with an aspect of the disclosure.

In some aspects, the device includes a transmitter, a high-frequency transducer, typically designed to operate at around 1 MHz, attached to a fluid-filled container, or mixing volume, containing a non-linear material, for example a cylinder filled with Fluorinert FC-43 or a similar inert liquid with low sound velocity. The length and width of mixing chamber of the non-linear material can be very compact and can be as small as 12 cm by 6 cm as shown in FIG. 16 for beam frequency range 20-120 kHz. The chamber can be reduced to dimensions of 5 cm by 3 cm if the low end of the beam frequency range is increased to 50 kHz. The high-frequency transducer can excited by a fixed frequency and a chirped frequency signal, for example 1.03 MHz and a chirp of 0.91-1.01 MHz (primaries) that generate high-frequency acoustic beams propagating in the mixing fluid, for example FC-43. Due to the fluid's acoustic nonlinear properties, the high-frequency beams interact to produce the difference frequency and higher harmonics of the primaries. The primaries and higher harmonics can be attenuated in the mixing fluid (a property of the acoustic nonlinear fluid), and only the difference frequency will propagate further. The difference frequency beam resulting from the interaction of primary frequencies cited above is in the 20-120 kHz range. The combination of low frequency and narrow beam-width produced by acoustic nonlinear mixing makes the device a suitable candidate for acoustic imaging outside the borehole. Broad bandwidth low frequency acoustic beam tends to result in lower attenuation compared with high frequencies, while the narrow collimation may provide good resolution for acoustic imaging.

Figure 17:
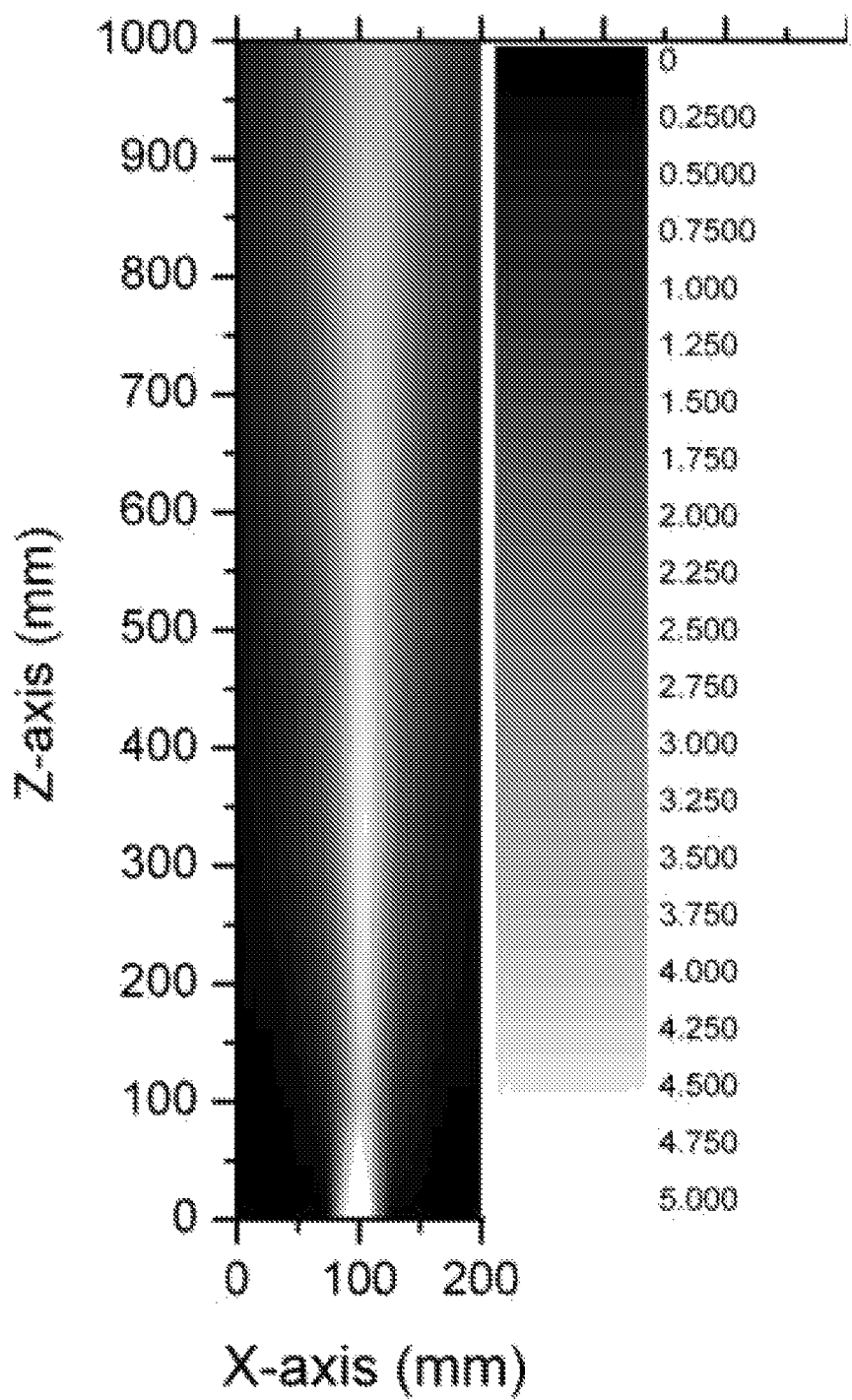
FIG. 17 shows the comparison of collimated radiation characteristic of the acoustic beam generated by the very compact device in FIG. 16 versus diffused radiation characteristic of the acoustic waves generated from a conventional transducer.
Figure 17:
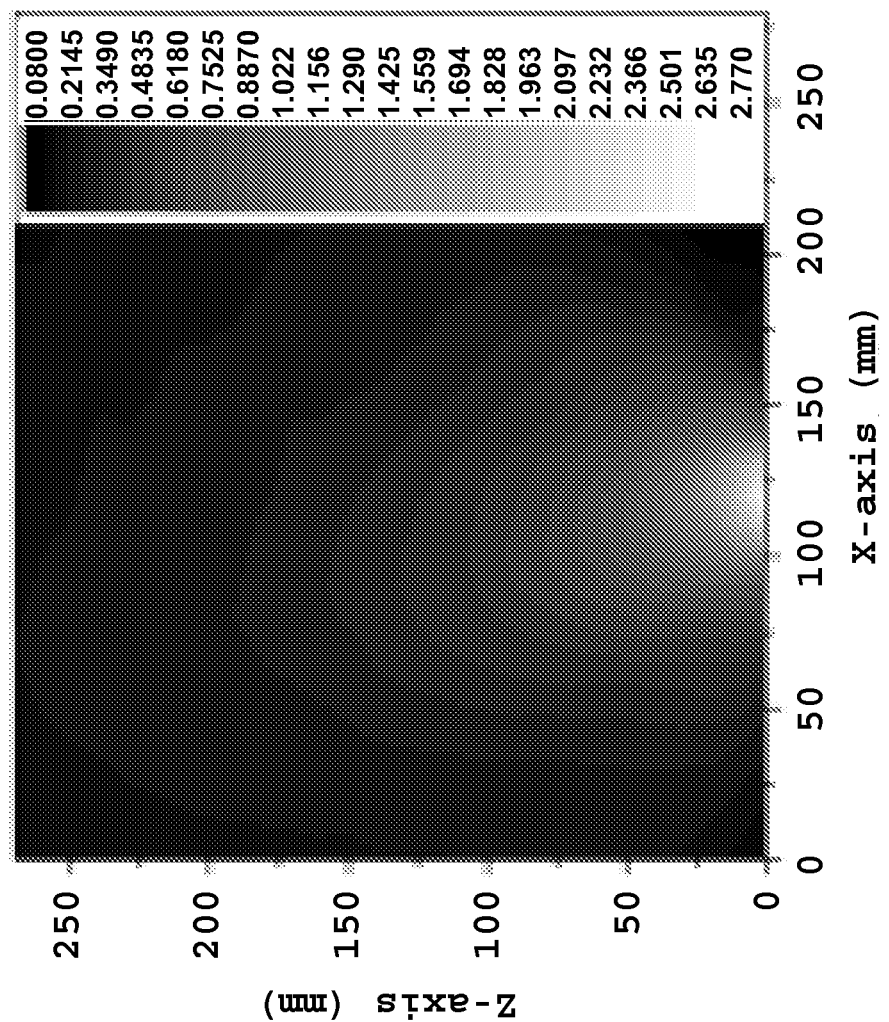

Typical conventional piezoelectric and other sound sources have a narrow bandwidth—a maximum of 30%. So, a device with a center frequency of 70 kHz would have a frequency range of approximately 60 to 80 kHz. To obtain this with a thickness mode piezoelectric disc or slab, the thickness and the diameter of the material have to be quite large to prevent the generation of various radial and other modes. The beam spread would also be very large as shown in the right hand side display of FIG. 17. Clearly, such a source does not produce a beam like radiation pattern. A source such as that shown in FIG. 16, using nonlinear mixing of two frequencies could emit (for example) a fixed frequency tone burst ($f_1$) and a chirp ($f_2$) with the same duration and a frequency ranging from 0.89 to 0.98 of $f_1$. This range is not absolute—the lower end of the $f_2$ range is limited because mixing efficiency deteriorates as the frequency difference $\Delta f$ increases with respect to $f_1$, and the high end because collimation requires a fluid filled container length of a minimum of about four difference frequency wavelengths. A fixed frequency $f_1$ in the range from 250 kHz to 1.5 MHz is appropriate for borehole applications. A fixed frequency $f_1$ of 1.03 MHz and $f_2$ in the range described above from about 0.91 to 1.01 MHz would generate a collimated beam with center frequency of 70 kHz and a range from 20 kHz to 120 kHz. The left side display of FIG. 17 shows the beams generated by two transducers of similar (38 and 28 mm diameter respectively), one optimized for 100 kHz operating at 83 kHz, and the other optimized for 1 MHz emitting electronically mixed signals of 0.953 and 1.036 MHz, generating a difference frequency beam of 83 kHz. The measurements were made in water. The difference frequency beam remains collimated at one meter from the source.

Figure 18:
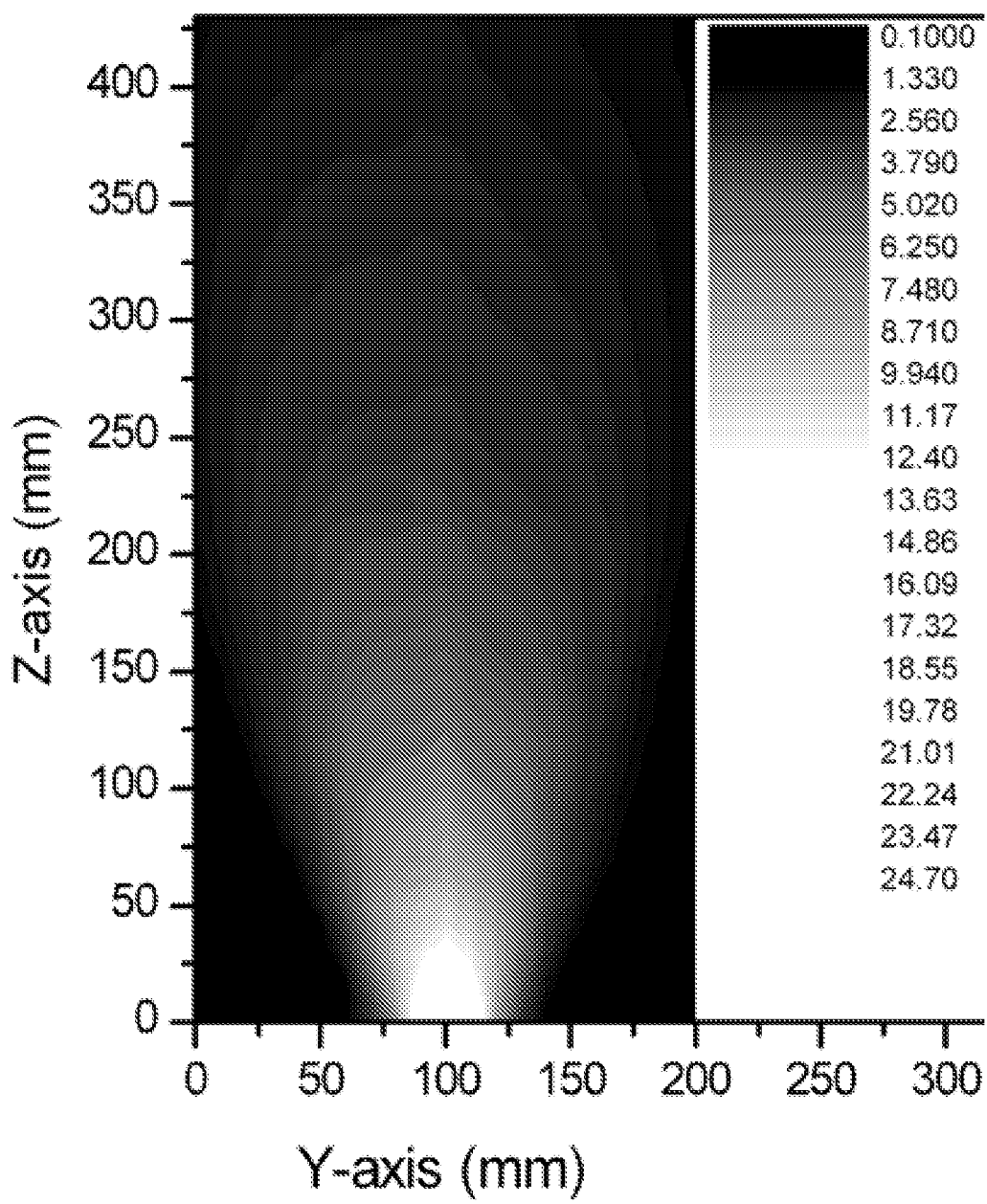
FIG. 18 shows the pulse wave train, frequency spectrum from 50 to 150 kHz and the radiation characteristic of the beam acoustic pulse generated by the compact device in FIG. 16.

In some aspects, a compact source as shown in FIG. 16 can be used to generate an acoustic pulse with a broad bandwidth traveling along a collimated beam trajectory. For example, when two primary Gaussian pulses, one with central frequency $f_1$ and bandwidth spread of $\sigma_1$ and the other with one with central frequency $f_2$ and bandwidth spread of $\sigma_2$, are mixed in the chamber containing a non-linear material, a secondary acoustic pulse with central frequency ($f_1-f_2$) and bandwidth of approximately ($\sigma_1+\sigma_2$) is produced. For example, two Gaussian pulses with central frequency 1.025 MHz and 1.075 MHz both with bandwidth spread of 40 KHz, were mixed in the chamber to produce an acoustic pulse and its corresponding frequency spectrum of 25-150 kHz and having a collimated trajectory as shown in FIG. 18. Generating the acoustic pulse along a fixed collimated direction with the compact device via the parametric array mixing mechanism can be very flexible. The frequencies $f_1$ and $f_2$ and bandwidth spreads $\sigma_1$/and $\sigma_2$ can be controlled electronically allowing for flexible design and change of the frequency and bandwidth of the secondary acoustic pulse during measurement operation in borehole and elsewhere.

The collimated beam emanating from the source device can tend to diverge, and the beam's collimation can be improved by placing an acoustic lens or lens assembly beyond the volume where the primaries frequencies mix to generate the difference frequency beam. We have used Plexiglass®, but any material with low sound attenuation and the appropriate acoustic impedance may be used.

In some cases, an impedance contrast between the borehole fluid and the formation and the cylindrical borehole surface can cause an alternation of the beam geometry such that the beam can tend to converge to a focus and then diverge inside the formation. In this situation, the transformation of the received signals into images can become complicated. To compensate for this effect, a second acoustic lens or lens assembly, such as a diverging lens, can be placed between the acoustic mirror and the borehole wall, such that the beam remains more collimated outside the borehole. The purpose of the second acoustic lens or lens assembly is to anticipate the converging effect of the wellbore-formation interface that acts like a cylindrical lens by focusing the beam at a location in the formation beyond which it diverges. The focusing effect of the interface depends on the borehole curvature and the impedance contrast between mud and formation. The functionality of the first and second lens assemblies to keep the beam collimated is illustrated in FIGS. 19*a* and 19*b*.

Figures 19A, 19B:
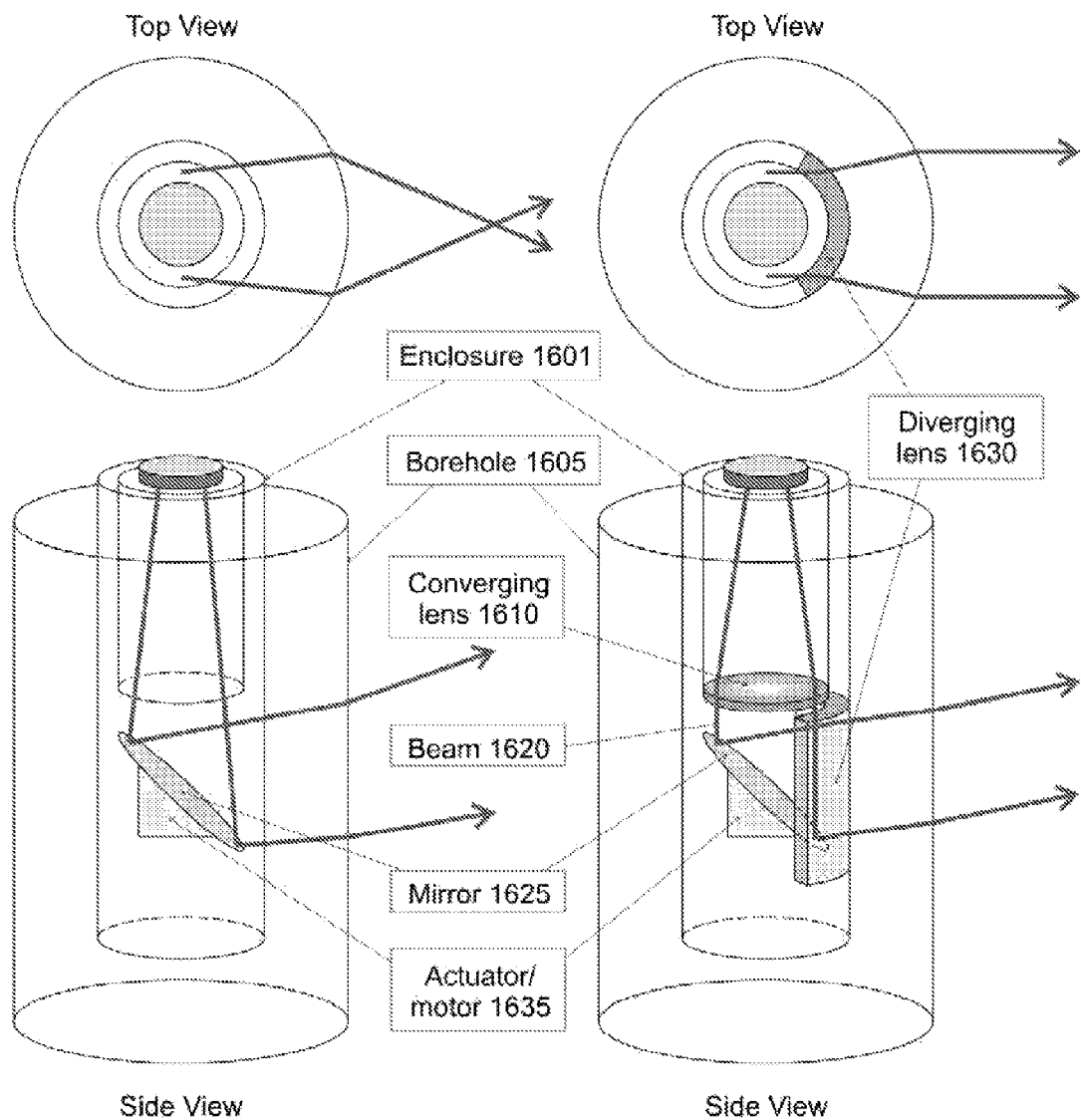
FIGS. 19a and 19b show a schematic of the axially mounted source, acoustic lens and mirror sub-assembly showing beam steering and focusing by mirror and lens sub-assembly to maintain collimation of acoustic beam inside the device and in the materials and formation surrounding the borehole.

FIGS. 19*a* and 19*b* show an aspect of the disclosure where the device is used with a two lens assembly. In particular, FIG. 19*a* shows both a side and top view of a device including the enclosure 1601 and the mirror 1625 positioned within the borehole 1605. FIG. 19*b* shows both a side and top view of a device including the enclosure 1601, the converging lens 1610, the mirror 1625 and the diverging lens 1630 positioned within the enclosure 1601 in the borehole 1605. As described above, one or more sources (not shown) are configured to produce signals at a first and a second frequency. The signals are transmitted to a signal amplifier (not shown) and then are transmitted to one or more transducers (not shown) that are configured to generate acoustic signals at the first and second frequencies. The acoustic signals propagate to a non-linear material (not shown), as described above, which mixes the signals by way of the mixing process to produce an acoustic beam. The components above can be arranged in an enclosure 1601 within the borehole 1605. An acoustic lens 1610, such as a converging lens, can be arranged along a transmission path of the acoustic beam, i.e., but not limited to, near the exit face of the enclosure 1601, and/or in communication with the mixing volume/non-linear material, either directly or indirectly via an interface, to alter a beam geometry of the acoustic beam. For example, the beam geometry of the acoustic beam produced by the sources can be altered so that the beam 1620 refracted by the acoustic lens 1610 is more collimated that the beam that exited the enclosure 1601. Beam 1620 can be reflected off an acoustic reflector or acoustic mirror 1625 and directed to a second acoustic lens 1630, such as a diverging lens. The second acoustic lens 1630 can be configured to compensate for the alternation of the beam geometry produced by the interaction between the acoustic beam and the interface between the surface of the wall of the borehole and the material surrounding the borehole. The acoustic mirror or lenses can be arranged to rotate by one or more actuators or motors 1635. For example, the diverging lens can be a cylindrical lens that is configured to counteract the converging effects on the beam caused by the curvature of the borehole. The acoustic beam can then refracted by the second acoustic lens 1630 and directed outside the borehole 1605. The first and the second acoustic lens 1610 and 1630 can be a Fresnel lens made of Plexiglass or other suitable materials having a low sound attenuation and the appropriate acoustic impedance and that when appropriately shaped modifies the beam by either converging or diverging the beam depending on the particular arrangement of the lens.

The acoustic reflector or acoustic mirror 1625 and the second acoustic lens 1630 can be rotated about a longitudinal axis of the borehole 1605 to generate one or more circumferential images of the formations outside the borehole. Additionally, the inclination of the mirror with respect to the borehole axis can be controlled to alter the angle of incidence of the beam at the borehole wall.

The external dimensions of logging tools determine the range of hole sizes in which they can operate. A device with an operating frequency range of 20 to 120 kHz, using FC43 as the non-linear material, could be built with a diameter of about four inches, making it usable in borehole diameters of six inches and above. Larger devices generating more powerful collimated beams, and operating at lower frequencies could be used in larger diameter boreholes. A scaled down device operating at higher frequencies could be lowered through production tubing for service in completed wells.

Acoustic impedance contrasts due to local inhomogeneity, planar fractures etc. outside the borehole cause reflection or scattering of the acoustic beam, some of which will return to the borehole. In a cased hole, energy is reflected from the inner wall of the casing, the outer wall of the casing that may or may not be attached to cement, any voids in the cement, the cement or fluid interface to the formation, and any additional concentric casing strings. In an open hole application, energy is reflected from impedance boundaries due (for example) to drilling induced formation mechanical alteration, fluid invasion, natural fractures, nodules of secondary minerals and bed boundaries.

Figure 20:
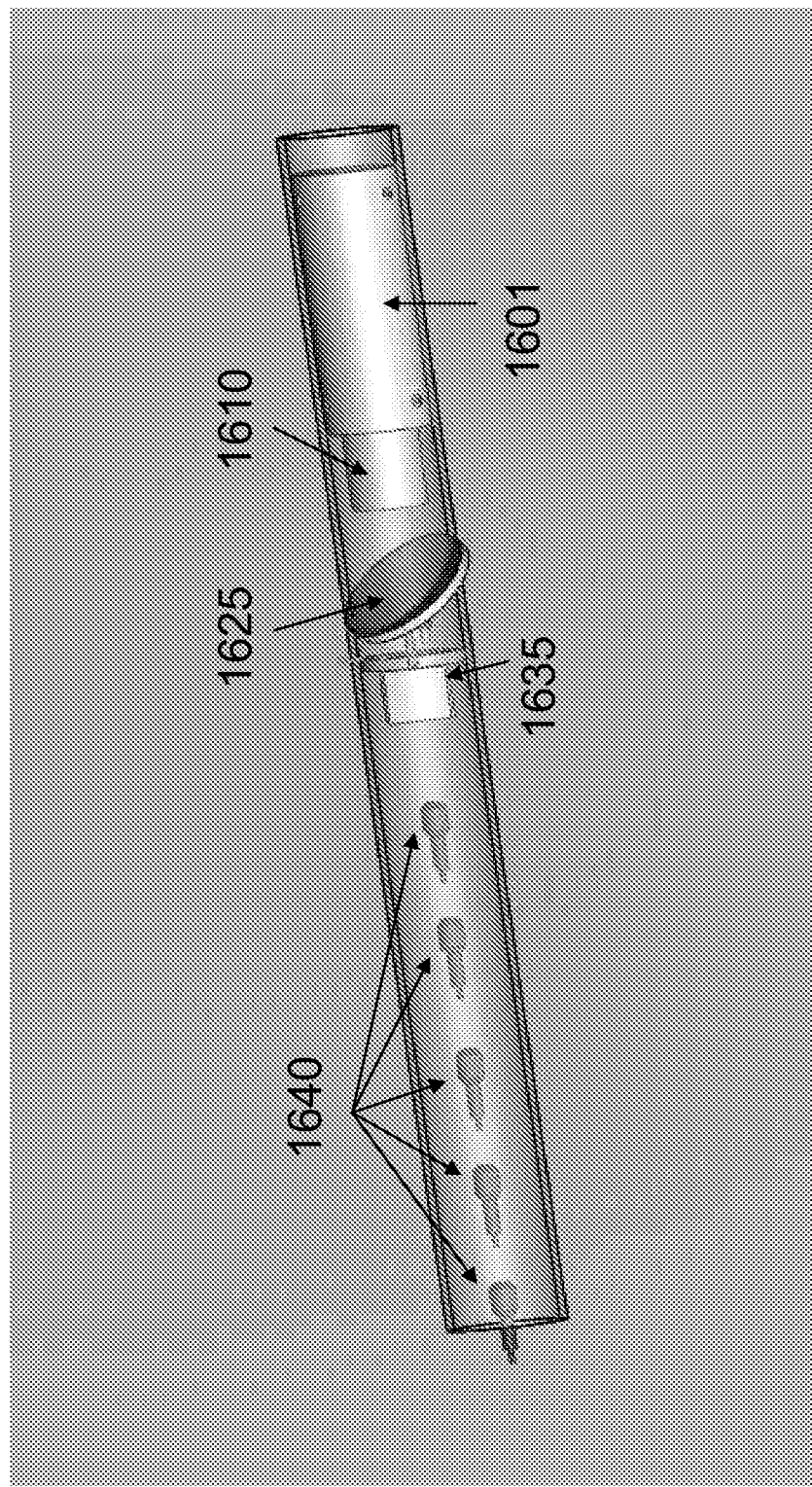
FIG. 20 shows schematic of a prototype device incorporating the source, acoustic mirror and lens, and receiver array.

A system using the source device described above and receivers to detect scattering energy from outside the borehole for 3D borehole reflection seismology to create a 3D dimensional image of the earth surrounding the borehole is shown in FIGS. 19*a*, 19*b* and 20. The system comprises the acoustic source with rotatable mirrors, such as reflector 1625, and lenses, such as lenses 1610 and/or 1630, that are rotatable through one or more actuators/motors 1635 and which can be mounted within the logging tool and a receiver array 1640, which are mounted along the tool placed in the borehole to detect the reflection signal. The entire system can be moved up and down the borehole as in 2D reflection surface seismology. Rotating the mirror causes the beam from the parametric array source to scan the borehole circumference in azimuth to obtain a full 3D image around the borehole. Tilting the mirror alters the inclination of the beam from the parametric array source and repeating the azimuth scan will create another full 3D image. The set of multiple 3D images provide redundancy. The set of multiple 3D images can be appropriately combined to improve the definition of the overall 3D image definition with signal processing techniques.

Figure 21A:
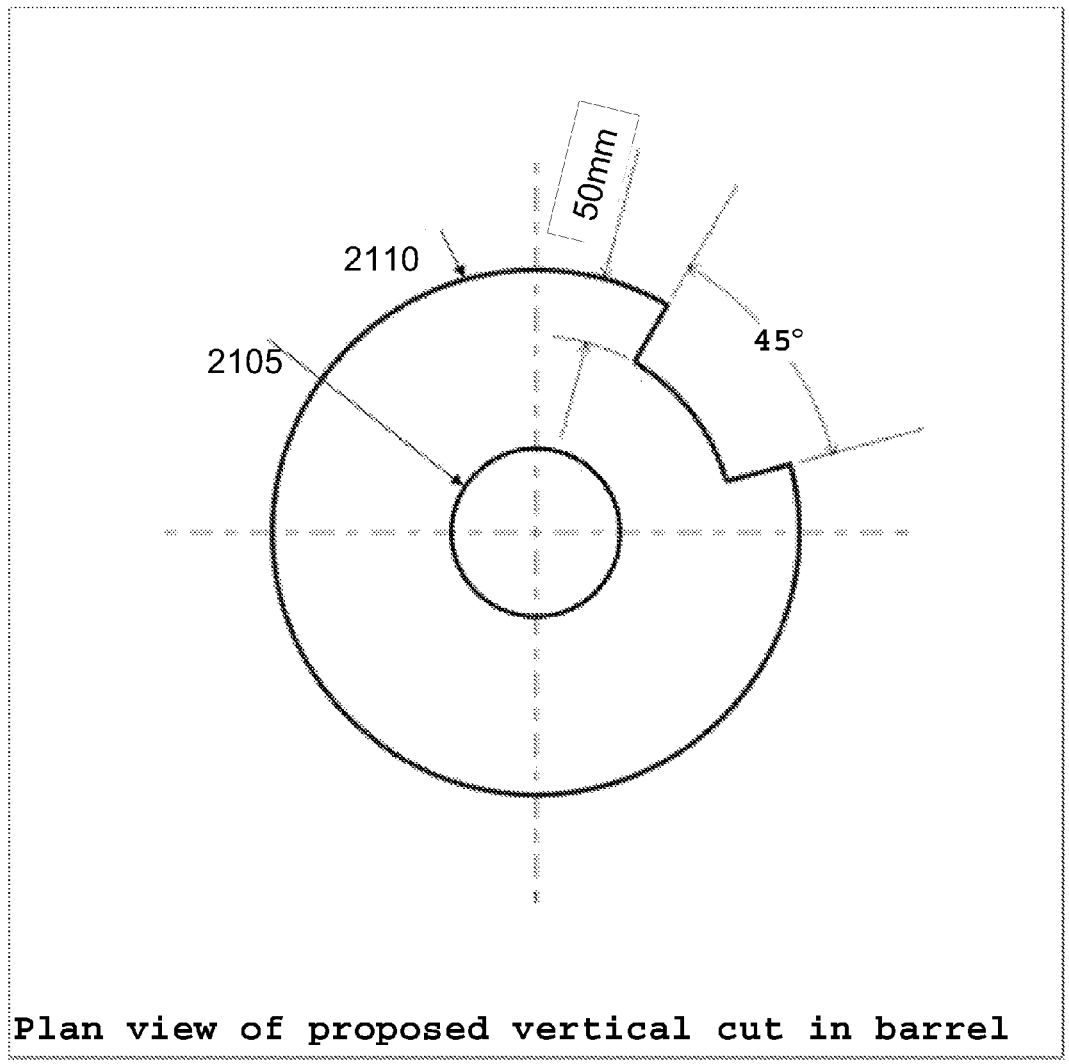
FIGS. 21a and 21b show an example of a system in which laboratory experiments for the operation of the arrangement of FIG. 20 were performed.

Apparatus for laboratory experiments to demonstrate the operation of the measurement system described above are shown in FIGS. 21*a* and 22*b*. In particular, FIG. 21*a* shows a plan view of a proposed vertical cut in a barrel and FIG. 22*b* shows a cross-section showing components and dimensions of the various components of the apparatus. In FIG. 21*a*, a 146 mm diameter Plexiglass pipe 2105 was centered in a plastic barrel 2110 and the intervening annulus filled with cement. The barrel shell was then removed and a 45 degree wide, 50 mm deep channel excavated along the length of the cylinder. A 180 mm diameter circular hole with a similar depth was cut on the opposite side. In FIG. 22*b*, an axially mounted transmitter assembly 2115, acoustic mirror 2120 and array of 12 receivers 2130 were arranged along the length of the barrel 2110. The transmitter signal was first recorded in a water trough.

Figure 21B:
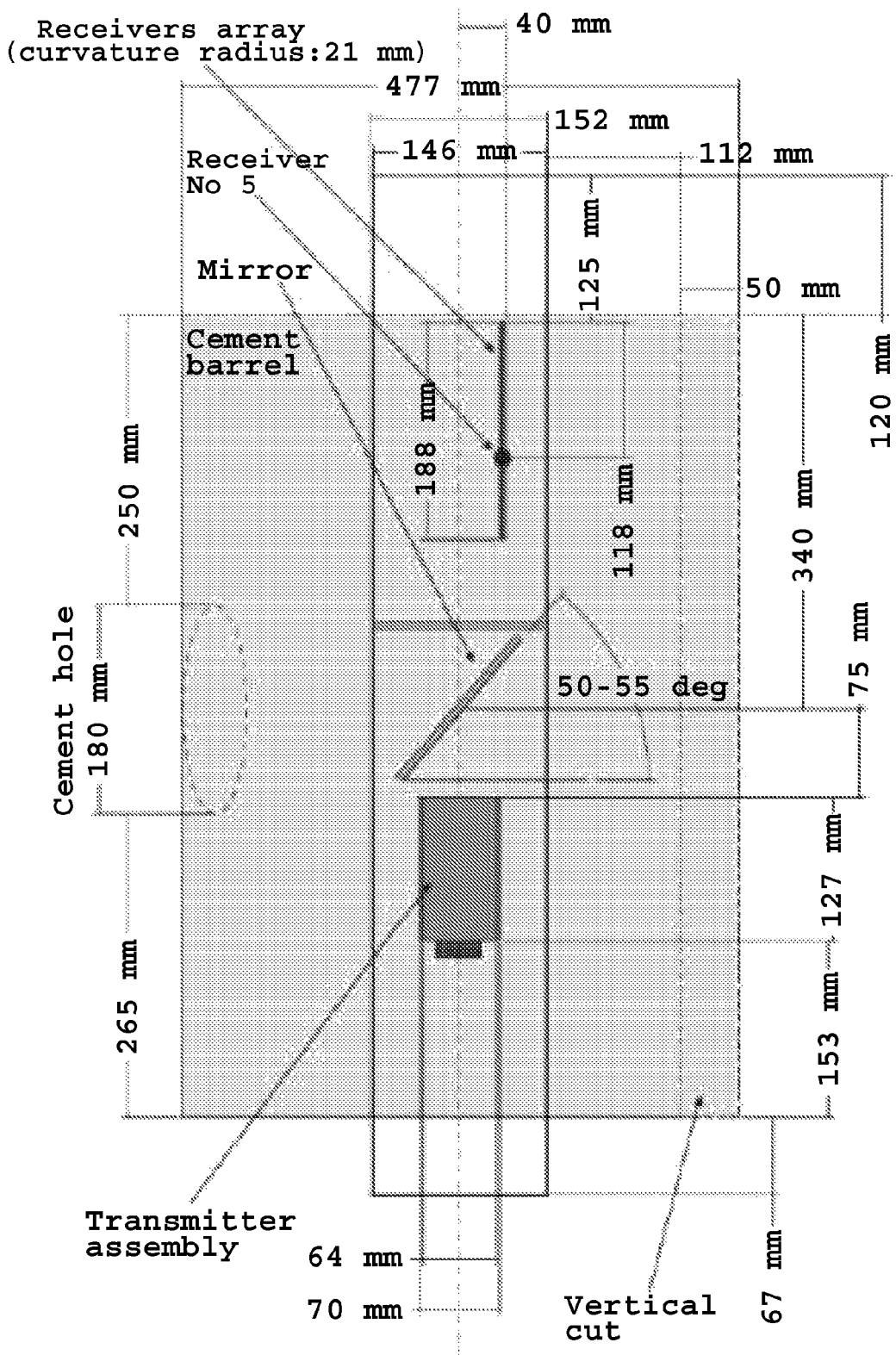
Figure 22:
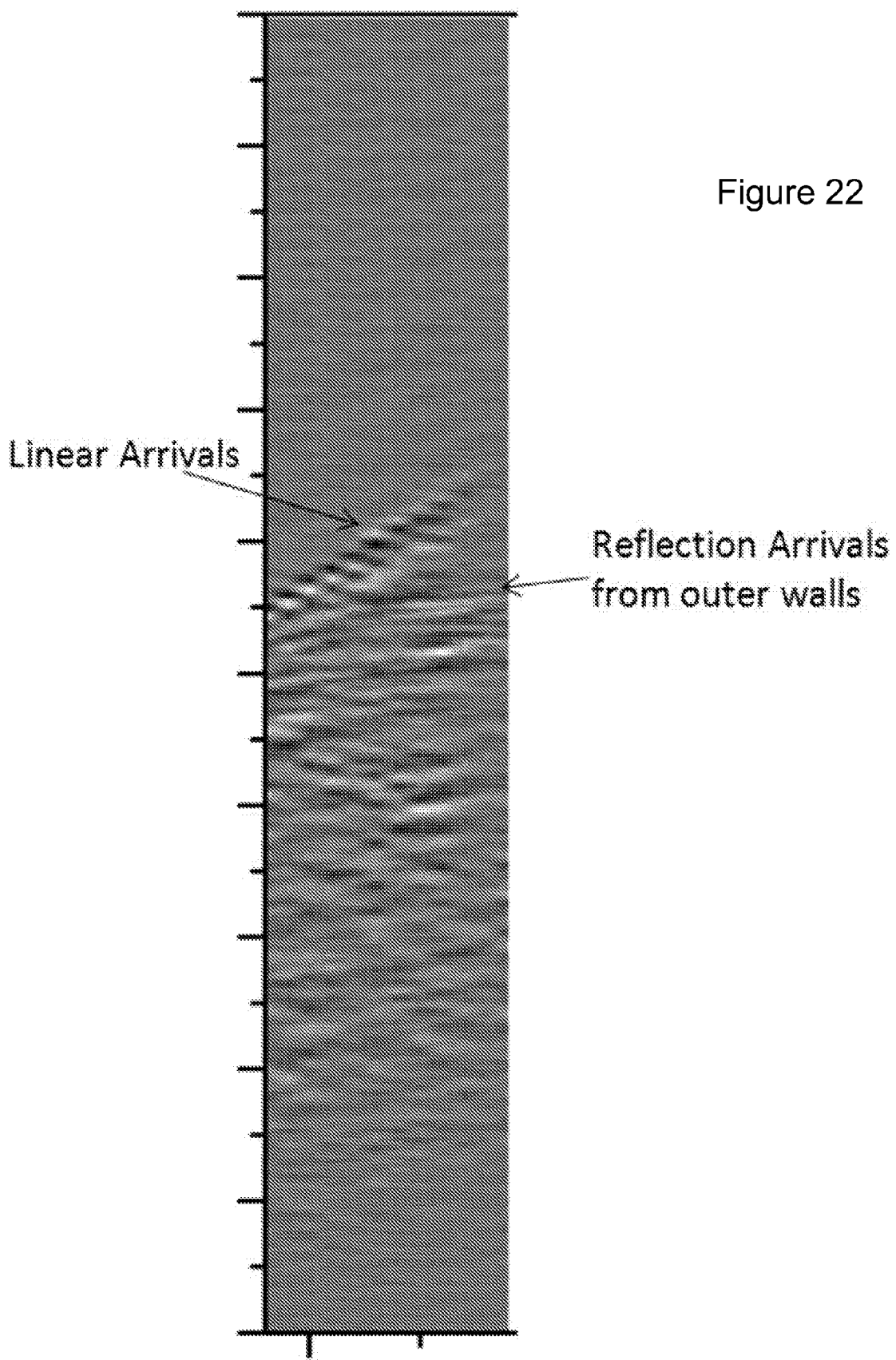
FIG. 22 shows a signal detected by each of the receivers in the array for the fixed source location with the beam oriented at constant azimuth and inclination direction of the arrangement of FIG. 21.

Reflection data were recorded by several receivers in the array from one source with one azimuth and one inclination at one transmitter location with the apparatus shown in FIGS. 21*a* and 21*b*. This data are commonly known as multi-offset data in seismic industry. The received signals were correlated with the chirped beam signal and a deconvolution of the source signal was subsequently performed in accordance of standard signal processing theory. The resulting deconvolved signal is shown in FIG. 22. This would correspond to an offset panel display in surface seismology. Various direct linear arrivals of propagation along the borehole walls and reflections from the outer walls are visible.

Figure 23:
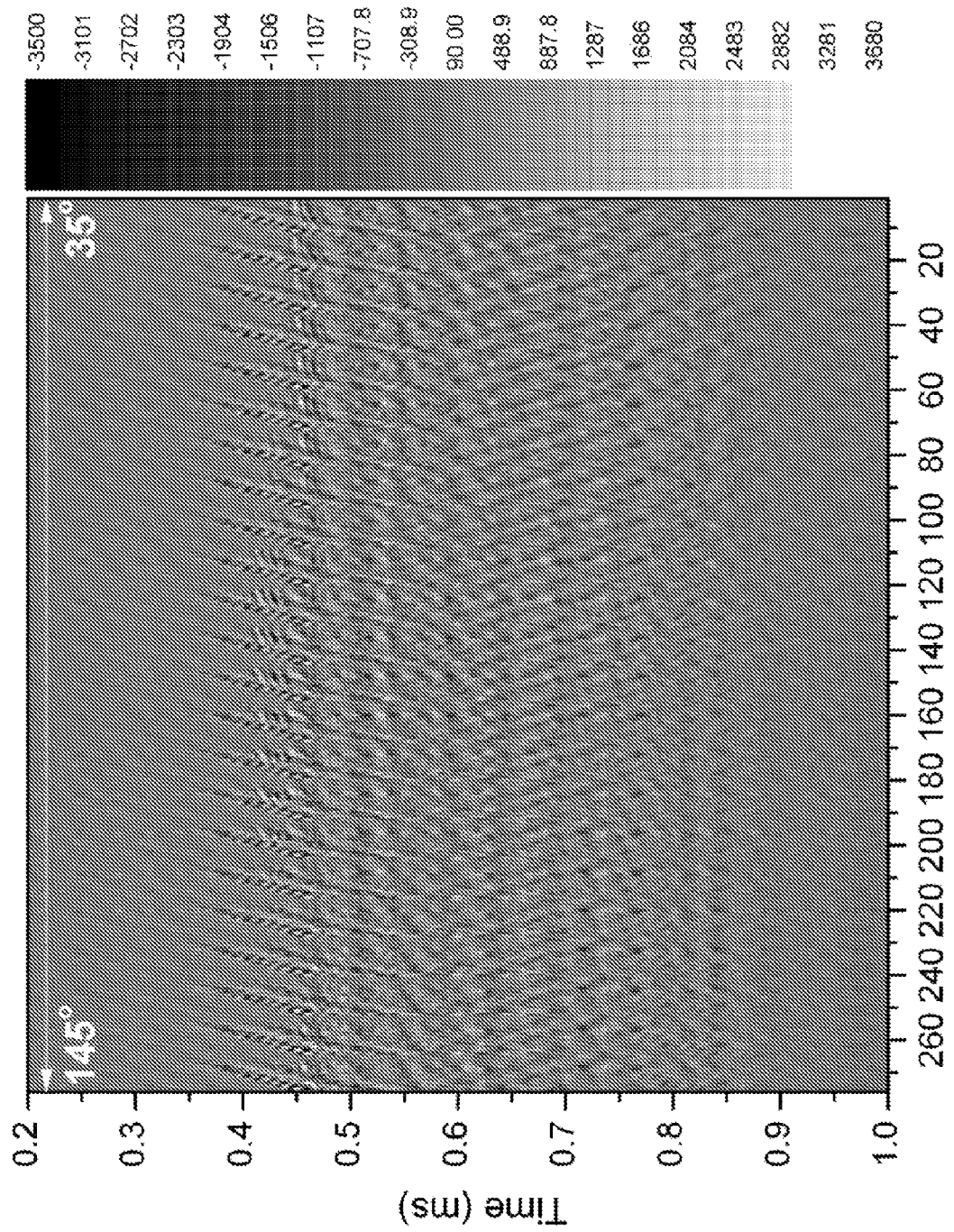
FIG. 23 shows a multi-azimuth panel display covering 35 to 145 degrees of azimuth for the arrangement of FIG. 21

The experiment was repeated for multiple azimuths in five degree increments and the example results are displayed in offset displays for multiple azimuths in FIG. 23. The figure shows a sequence of displays of multiple azimuth offset panels covering 35 to 145 degrees of azimuth. The x-axis is scaled in trace number and each offset panel has 12 traces with consecutive panels correspond to five degrees increment. The reflection signals from outside the borehole are visible in various azimuth sections. The travel time of the reflection signals clearly show variation in arrival times corresponding with the variability of the dimension of the outside wall.

Figure 24:
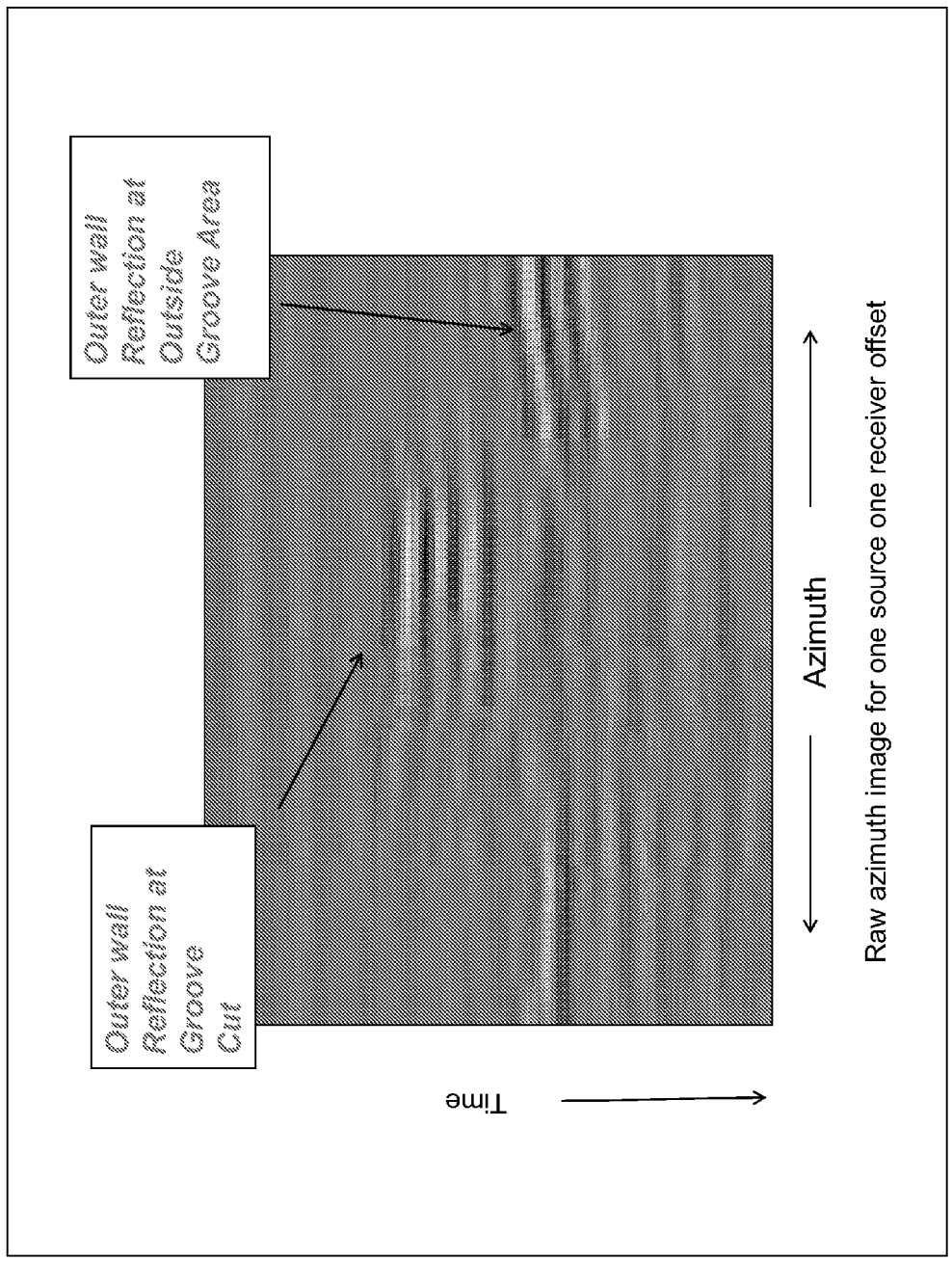
FIG. 24 shows an image created by plotting the signal from the same receiver at increments of five degrees over a range of 110 degrees of azimuth.

The same data can be re-sorted to display the detected signal for a single source receiver spacing, commonly known in seismic industry as offset spacing, versus azimuth as shown on FIG. 24. The geometric image of the groove is quite evident in the figure. The experiment can be repeated with different source beam inclination to provide more directional scanning and redundancy to improve the image.

The 3D borehole seismic reflection data collected by the described system can be processed through various imaging algorithms adapted from standard 3D imaging. For example each time the source radiates energy into one orientation of the mirror, the illuminating wavefield is characterized by the directivity of the source/mirror system and the Green's function between the source and any point inside the borehole and/or formation. The reciprocal path from receiver to any point inside the borehole/formation may be similarly considered as the combination of a directivity function and a Green's function. The modeled response from any point in the medium due to a particular source and receiver is the convolution of those source and receiver functions. At any point in the medium, the image contribution from each source/receiver pair is taken as the value of the zero-lag from the cross-correlation of the modeled response function with the recorded data. This particular system has certain geometrical features which may be exploited, such as replacing the source and mirror with a virtual source radiating through a mirror shaped aperture and exploiting cylindrical symmetry.

The recordings of the received waveforms are processed to generate an image of the reflection or transmission characteristics of the formation. The propagation direction of the beam and the time-of-flight may fix the locations where scattered waves are generated, distinguishing this device from normal sonic imaging techniques using conventional non-directional monopole and dipole sources. An associated effect of using a beam compared with conventional sources is that the computation of an image of formation acoustic properties may not require a detailed specification of the rock formation's velocity field. The propagation direction of the beam and the time-of-flight measurement simplify and improve the ability to identify the location where the waves are reflected or scattered. In particular, the knowledge of the orientation of the beam exiting the tool localizes the sources of recorded scattered waves along the beam direction, and the time delay localizes the position of scattered sources along the beam path. Thus, the borehole imaging with a beam source may present a simplification and reduction in uncertainty of the final time image in contrast to conventional (not beam) sources which require an accurate detailed velocity model for computation of the 3D image. Furthermore, because the beam is focused and steerable, in azimuth and inclination with respect to the borehole, the imaging would tend to have higher resolution than obtained with a conventional (not beam) source. The method allows for detailed imaging of features including invaded zones, cement bonding with casing, damaged zones, fractured zones, stratigraphic layering particularly at high apparent dip (the angle between the plane of the bedding and the plane perpendicular to the tool axis). The broad band difference beam frequency for the invention ranges from 1 kHz to 100 kHz. The low end of this frequency range, also used by some conventional sonic logging tools, achieves a depth of penetration up to one hundred feet. It is important to note that, because the beam is broadband and can be encoded, the signal to noise ratio of the detected signal may be considerably enhanced after processing and decoding. Because of the broadband beam characteristics with generally greater depth of penetration and higher signal to noise ratio due to encoding, the method also may allow for detailed imaging and/or characterization of non-linear properties of rock formation and its fluid contents surrounding the borehole.

The various acoustic beam sources described in detail above can be used in many applications derived from imaging around the borehole. For example, the above-described acoustic beam sources can be used for various evaluation of natural fractures, mapping of vugs, nodules or other inhomogeneities, evaluation of the presence and properties of the cement sheath between one or more casing strings and the formation around a cased well, mapping fluid invasion from the borehole and assessment of the mechanical integrity of the formation around the wellbore, in particular any alteration caused by the near wellbore stress concentration. There are additional applications for the compact source in fields such as non-destructive testing.

The various configurations described in detail above are for the purposes of illustration only. Modifications to the configurations can be made for other applications without departing from the invention. For example, in the Logging While Drilling (LWD) and pipe conveyed configurations, using technology that allows the tool to pass through the bottom of the drill string, the compact acoustic beam generation device will enable efficient look ahead of the bit resulting in the detection of over-pressured zones or significant changes in the rheology of the formation before they are reached by the drill-bit. Steering of the beam also enables the indirect measurement of the dip and azimuth of reflecting bodies ahead of the bit. Another application is the detection of fault geometry ahead of the bit.

The term "lens," as used herein, should be understood to include both refractive and reflective structures and materials as will be appreciated by those skilled in the art.

Although the invention has been described in detail for the purpose of illustration based on what is currently considered to be a variety of useful embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC including machine executable instructions and programmed to execute the methods, a computer array or network, or other appropriate computing device. As shown in FIGS. 10 and 14, the data collected by the receivers would undergo some processing and are either stored in memory in the tool, or transmitted up hole for further processing and storage. As a further example, it is to be understood that the present invention contemplates that, to the extent possible, one or more features of any embodiment can be combined with one or more features of any other embodiment.

What is claimed is:

1. A method of generating a collimated pulse of acoustic energy in a borehole, the method comprising:
   generating a first broad-band acoustic pulse at a first broad-band frequency range having a first central frequency and a first bandwidth spread;
   generating a second broad-band acoustic pulse at a second broad-band frequency range different from the first broad-band frequency range having a second central frequency and a second bandwidth spread, wherein the first acoustic pulse and second acoustic pulse are generated by at least one transducer arranged on a tool located within the borehole; and
   transmitting the first and the second broad-band acoustic pulses into an acoustically non-linear medium, wherein a composition of the non-linear medium produces a collimated pulse by a non-linear mixing of the first and second acoustic pulses,
   wherein the collimated pulse has a central frequency equal to a difference in frequencies between the first central frequency and the second central frequency and a bandwidth spread equal to the sum of the first bandwidth spread and the second bandwidth spread.

2. The method in accordance with claim 1, wherein the frequency range of the collimated acoustic pulse has a central frequency that is between 15 kHz and 120 kHz.

3. The method in accordance with claim 1, wherein the non-linear medium is selected from the group consisting of: a mixture of liquids, a solid, a granular material, embedded microspheres, an emulsion, and a combination thereof.

4. The method in accordance with claim 1, wherein the bandwidth spread of the collimated pulse is between 50% and 200% of the first central frequency.

5. The method in accordance with claim 1, wherein the bandwidth spread of the collimated pulse is between 50% and 200% of the second central frequency.

6. The method in accordance with claim 1, further comprising transmitting the collimated pulse into a material around the borehole.

7. The method in accordance with claim 6, wherein the material is rock formation, cement, or casing, or combinations thereof.

8. The method in accordance with claim 1, wherein the non-linear medium has a velocity of sound between 100 m/s and 800 m/s.

9. The method in accordance with claim 1, further comprising reflecting and guiding the collimated acoustic pulse by an acoustic mirror.

10. A wireline or pipe conveyed logging tool positionable within a borehole, the tool comprising:
   a housing;
   at least one transducer, carried by the housing, and configured to produce a first acoustic pulse at a first frequency range having a first central frequency and a first bandwidth spread and a second acoustic pulse at a second frequency range different from the first frequency range and having a second central frequency and a second bandwidth spread; and
   a non-linear medium carried by the housing, wherein a composition of the non-linear medium is configured to produce a collimated pulse by a non-linear mixing of the first and second acoustic pulses,
   wherein the collimated pulse has a frequency equal to the difference in frequencies between the first central frequency and the second central frequency and a bandwidth spread equal to the sum of the first bandwidth spread and the second bandwidth spread.

11. The tool in accordance with claim 10, wherein the frequency range of the collimated acoustic pulse has a central frequency that is between 15 kHz and 120 kHz.

12. The tool in accordance with claim 10, wherein the non-linear medium is selected from the group consisting of: a mixture of liquids, a solid, a granular material, embedded microspheres, an emulsion, and a combination thereof.

13. The tool in accordance with claim 10, wherein the bandwidth spread of the collimated pulse is between 50% and 200% of the first central frequency.

14. The tool in accordance with claim 10, wherein the bandwidth spread of the collimated pulse is between 50% and 200% of the second central frequency.

15. The tool in accordance with claim 10, wherein the tool further comprises structure constructed and arranged to direct the collimated pulse into a material around the borehole.

16. The tool in accordance with claim 15, wherein the material is rock formation, cement, or casing, or a combination thereof.

17. The tool in accordance with claim 15, wherein the non-linear medium has a velocity of sound between 100 m/s and 800 m/s.

18. The tool in accordance with claim 15, wherein the structure comprises an acoustic mirror configured to reflect and guide the collimated acoustic pulse.

* * * * *